US012358679B2

(12) United States Patent
Mangold et al.

(10) Patent No.: US 12,358,679 B2
(45) Date of Patent: Jul. 15, 2025

(54) HOLLOW BODY, IN PARTICULAR FOR PACKAGING A PHARMACEUTICAL COMPOSITION, HAVING A LAYER OF GLASS AND A SURFACE REGION WITH A CONTACT ANGLE FOR WETTING WITH WATER

(71) Applicant: SCHOTT Pharma AG & Co. KGaA, Mainz (DE)

(72) Inventors: Stephanie Mangold, Klein-Winternheim (DE); Eveline Rudigier-Voigt, Mainz (DE); Tamara Sweeck, Bad Kreuznach (DE); Andrea Anton, Hüffelsheim (DE)

(73) Assignee: SCHOTT Pharma AG & Co. KGaA, Mainz (DE)

( * ) Notice: Subject to any disclaimer, the term of this patent is extended or adjusted under 35 U.S.C. 154(b) by 614 days.

(21) Appl. No.: 16/354,836

(22) Filed: Mar. 15, 2019

(65) Prior Publication Data

US 2019/0283919 A1      Sep. 19, 2019

(30) Foreign Application Priority Data

Mar. 16, 2018   (EP) ..................... 18162361

(51) Int. Cl.
*A61J 1/14*        (2023.01)
*A61J 1/03*        (2023.01)
(Continued)

(52) U.S. Cl.
CPC .............. *B65D 1/0215* (2013.01); *A61J 1/03* (2013.01); *A61J 1/1468* (2015.05); *B65B 3/003* (2013.01);
(Continued)

(58) Field of Classification Search
CPC .............. A61J 1/1468; A61J 1/06–065; C03C 23/08–0835; C03C 17/003; C03C 17/32;
(Continued)

(56) References Cited

U.S. PATENT DOCUMENTS 3,418,153 A      12/1968   Levene
4,204,021 A *    5/1980    Becker ................... B05D 5/086
                                              427/247

(Continued)

FOREIGN PATENT DOCUMENTS

CA       2447414 A1 *   11/2002   ............. C03C 17/00
CN       104129709 A    11/2014
(Continued)

OTHER PUBLICATIONS

Lee, Sangwha, et al. "The Wettability of Fluoropolymer Surfaces: Influence of Surface Dipoles." Langmuir, vol. 24, No. 9, 2008, pp. 4817-4826., doi:10.1021/la700902h. (Year: 2008).*

(Continued)

*Primary Examiner* — Michael C Romanowski
(74) *Attorney, Agent, or Firm* — TAYLOR & EDELSTEIN, PC

(57) ABSTRACT

A hollow body includes a wall which at least partially surrounds an interior volume of the hollow body. The wall comprises a layer of glass and has a wall surface. The wall surface comprises a surface region which is characterized by a contact angle for wetting with water of at least 80°. A process for making an item; a hollow body obtainable by this process; a closed container; a process for packaging a pharmaceutical composition; a closed hollow body obtainable by this process; a use of one of the hollow bodies; and a use of a perfluorinated silane or a perfluorosulfonic acid or both is also provided.

8 Claims, 16 Drawing Sheets

(51) Int. Cl.
| | |
|---|---|
| *B65B 3/00* | (2006.01) |
| *B65D 1/02* | (2006.01) |
| *B65D 23/02* | (2006.01) |
| *B65D 23/08* | (2006.01) |
| *C03C 17/00* | (2006.01) |
| *C03C 17/30* | (2006.01) |
| *C08G 77/06* | (2006.01) |
| *C08G 77/08* | (2006.01) |
| *C08G 77/24* | (2006.01) |
| *C08G 77/26* | (2006.01) |
| *C09D 4/00* | (2006.01) |
| *C09D 183/02* | (2006.01) |
| *C09D 183/08* | (2006.01) |

(52) U.S. Cl.
CPC ........... *B65D 1/0207* (2013.01); *B65D 23/02* (2013.01); *B65D 23/08* (2013.01); *C03C 17/003* (2013.01); *C03C 17/004* (2013.01); *C03C 17/005* (2013.01); *C03C 17/007* (2013.01); *C03C 17/30* (2013.01); *C08G 77/06* (2013.01); *C08G 77/08* (2013.01); *C08G 77/24* (2013.01); *C08G 77/26* (2013.01); *C09D 4/00* (2013.01); *C09D 183/02* (2013.01); *C09D 183/08* (2013.01); *C03C 2217/42* (2013.01); *C03C 2217/75* (2013.01); *C03C 2217/76* (2013.01); *C03C 2217/78* (2013.01); *C03C 2218/111* (2013.01)

(58) Field of Classification Search
CPC ............ C03C 2217/75; C03C 2217/76; C03C 2217/78; C03C 17/005–007; C03C 17/30; C03C 17/28; C03C 17/34; C03C 17/42; B65D 23/0807–0835; B65D 23/08–0835
USPC ........... 106/287.1; 428/34.1–36.92; 427/181, 427/203, 204, 205
See application file for complete search history.

(56) References Cited

U.S. PATENT DOCUMENTS

| | | | | |
|---|---|---|---|---|
| 4,224,365 | A | | 9/1980 | Ali-Zaidi |
| 4,267,213 | A | * | 5/1981 | Beck ............ C03C 17/30 428/428 |
| 4,420,578 | A | | 12/1983 | Hagens et al. |
| 4,816,333 | A | * | 3/1989 | Lange ............ G02B 1/113 428/404 |
| 5,284,508 | A | * | 2/1994 | Shibata et al. ....... C09D 191/00 |
| 5,498,657 | A | * | 3/1996 | Sugiyama ............ C08K 5/0008 524/544 |
| 5,585,186 | A | * | 12/1996 | Scholz ............ C03C 17/009 428/452 |
| 5,605,958 | A | * | 2/1997 | Yoneda ............ C09D 201/00 524/766 |
| 5,814,397 | A | * | 9/1998 | Cagliostro ............ C04B 41/52 428/920 |
| 5,849,942 | A | * | 12/1998 | Standke ............ C04B 41/4961 556/424 |
| 5,976,702 | A | * | 11/1999 | Yoneda ............ C08G 18/778 428/447 |
| 6,123,797 | A | * | 9/2000 | Pyzik ............ C23C 24/10 427/217 |
| 6,177,582 | B1 | * | 1/2001 | Jenkner ............ C08G 77/24 556/424 |
| 6,210,750 | B1 | * | 4/2001 | Cho ............ C03C 17/42 428/428 |
| 6,299,981 | B1 | * | 10/2001 | Azzopardi ............ C03C 15/00 428/401 |
| 6,310,116 | B1 | * | 10/2001 | Yasuda ............ C08J 5/00 523/106 |
| 6,485,794 | B1 | * | 11/2002 | Li ............ B65D 23/0828 508/579 |
| 6,486,245 | B1 | * | 11/2002 | Thunemann ........ B01D 67/0088 524/133 |
| 6,511,753 | B1 | * | 1/2003 | Teranishi ............ C09D 4/00 528/42 |
| 6,599,594 | B1 | * | 7/2003 | Walther ............ C03C 17/22 215/12.2 |
| 8,053,492 | B2 | | 11/2011 | Poe et al. |
| 8,609,197 | B1 | * | 12/2013 | Remington, Jr. ...... C03C 17/005 65/60.2 |
| 9,428,302 | B2 | | 8/2016 | Fadeev et al. |
| 9,668,936 | B2 | | 6/2017 | Fadeev et al. |
| 9,744,099 | B2 | | 8/2017 | Fadeev et al. |
| 9,763,852 | B2 | | 9/2017 | Fadeev et al. |
| 9,775,775 | B2 | | 10/2017 | Fadeev et al. |
| 10,155,858 | B2 | | 12/2018 | Bhagwager et al. |
| 2005/0233135 | A1 | * | 10/2005 | Iyer et al. ............ B32B 9/04 |
| 2007/0041887 | A1 | * | 2/2007 | Veedu ............ B82Y 30/00 423/447.2 |
| 2008/0274295 | A1 | * | 11/2008 | Cavero ............ C09D 5/031 427/180 |
| 2009/0104387 | A1 | | 4/2009 | Postupack et al. |
| 2009/0275826 | A1 | * | 11/2009 | Enzerink ............ C09D 5/1681 428/141 |
| 2010/0304086 | A1 | * | 12/2010 | Carre ............ C03C 17/42 977/773 |
| 2012/0107558 | A1 | * | 5/2012 | Koval ............ C03C 17/3429 977/773 |
| 2013/0034653 | A1 | * | 2/2013 | Kumar ............ C08L 83/04 252/589 |
| 2013/0171456 | A1 | * | 7/2013 | Fadeev ............ C03C 17/32 428/429 |
| 2013/0334075 | A1 | * | 12/2013 | Young ............ B65D 23/02 141/1 |
| 2014/0147654 | A1 | * | 5/2014 | Walther ............ C23C 18/1212 428/448 |
| 2014/0305830 | A1 | * | 10/2014 | Bicker ............ A61J 1/1468 427/236 |
| 2014/0343206 | A1 | * | 11/2014 | Sasaki ............ C08K 5/07 526/245 |
| 2015/0153642 | A1 | * | 6/2015 | Yang ............ B81C 1/00206 430/11 |
| 2015/0160379 | A1 | * | 6/2015 | Shen et al. ............ C01G 30/02 |
| 2015/0210951 | A1 | * | 7/2015 | Aizenberg et al. ..... C03C 17/00 |
| 2015/0273518 | A1 | * | 10/2015 | Varanasi ............ B29C 49/00 427/372.2 |
| 2015/0299845 | A1 | * | 10/2015 | Zhou ............ C23C 14/022 204/192.15 |
| 2015/0343502 | A1 | * | 12/2015 | Clark ............ C09D 5/16 428/149 |
| 2016/0206508 | A1 | * | 7/2016 | Perrot ............ C08G 18/6279 |
| 2016/0251536 | A1 | * | 9/2016 | Brogan ............ C03C 17/30 524/114 |
| 2017/0002174 | A1 | * | 1/2017 | Bhagwagar ........ C08F 222/105 |
| 2017/0058130 | A1 | * | 3/2017 | Addleman ............ B05D 5/08 |
| 2017/0096365 | A1 | * | 4/2017 | Henn ............ C03C 17/3435 |
| 2017/0145039 | A1 | * | 5/2017 | Fujita ............ C09D 5/00 |
| 2017/0233650 | A1 | * | 8/2017 | Lu ............ C09K 13/08 252/79.3 |
| 2017/0252761 | A1 | * | 9/2017 | Meuler ............ C09D 127/18 |
| 2017/0320770 | A1 | | 11/2017 | Schwall et al. |
| 2017/0355851 | A1 | * | 12/2017 | Ye ............ C08K 3/346 |
| 2018/0214875 | A1 | * | 8/2018 | Miles ............ B01L 3/52 |
| 2018/0362780 | A1 | | 12/2018 | Yin et al. |
| 2019/0127270 | A1 | * | 5/2019 | Bureau ............ C03C 17/30 |
| 2020/0003938 | A1 | * | 1/2020 | Gasworth ............ B32B 27/28 |
| 2020/0190359 | A1 | * | 6/2020 | Chaudhari et al. .... B65D 85/72 |
| 2020/0325065 | A1 | * | 10/2020 | Granger ............ C08G 77/24 |

FOREIGN PATENT DOCUMENTS

| | | | | |
|---|---|---|---|---|
| DE | 10149933 | * | 4/2003 | ............ C03C 17/30 |
| DE | 10 2009 042 159 A1 | | 9/2011 | |
| EP | 2202209 A1 | * | 12/2010 | ............ C03C 17/28 |
| JP | H1192178 A | * | 4/1999 | ............ B65D 23/02 |
| JP | 2004258469 A | * | 9/2004 | ............ B32B 7/00 |

(56) References Cited

FOREIGN PATENT DOCUMENTS

| WO | WO-2011029857 A2 | * | 3/2011 | ........... C03C 17/005 |
| WO | WO-2014102298 A1 | * | 7/2014 | ............... G02B 1/18 |
| WO | 2017/178584 A1 |  | 10/2017 |  |
| WO | WO-2020042415 A1 | * | 3/2020 | ........... C03C 17/009 |

OTHER PUBLICATIONS

National Center for Biotechnology Information. "PubChem Compound Summary for CID 11006, Hexadecane" PubChem, https://pubchem.ncbi.nlm.nih.gov/compound/Hexadecane. Accessed Jun. 7, 2022. (Year: 2022).*

Yunxia Chen, Weimin Liu, Chengfeng Ye, Laigui Yu and Shangkui Qi, "Preparation and characterization of self-assembled alkanephosphate monolayers on glass substrate coated with nano—TiO2 thin film", Materials Research Bulletin 36, 2001, pp. 2605-2612 (8 pages).

Rebecca L. De Rosa and Steven R. Wagner, "Scratch Resistant Polyimide Coatings for Aluminosilicate Glass Surfaces", The Journal of Adhesion, vol. 78, 2002, pp. 113-127 (15 pages).

Yoshinori Yamada, Kyuichiro Tanaka and Kiyoshi Saito, "Friction and Damage of Coatings Formed by Sputtering Polytetrafluoroethylene and Polyimide", Surface and Coatings Technology, 43/44, 1990, pp. 618-628 (11 pages).

English translation of a Chinese Office Action dated Apr. 27, 2021 for Chinese Application No. 201910180951.4 (12 pages).

* cited by examiner

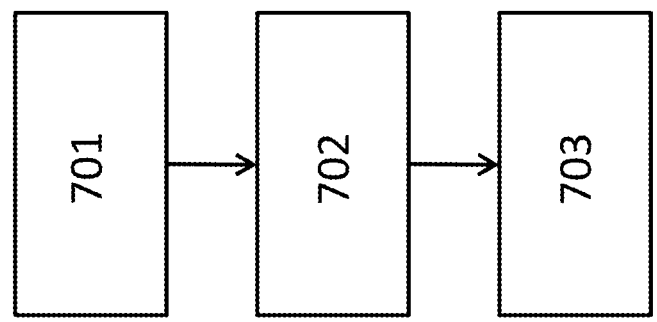

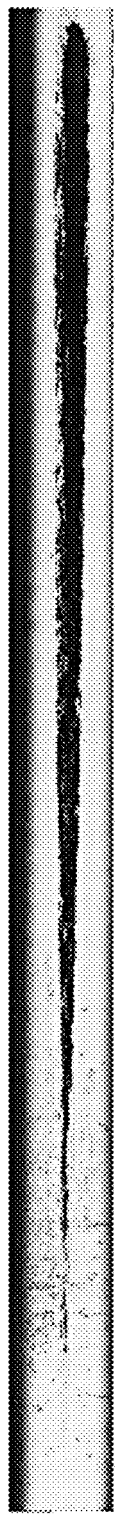
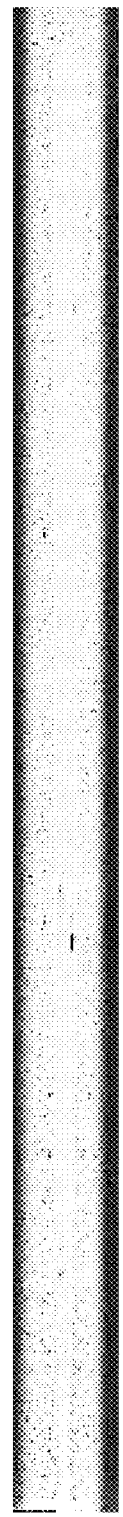
FIG. 8A
FIG. 8B
FIG. 8C

HOLLOW BODY, IN PARTICULAR FOR PACKAGING A PHARMACEUTICAL COMPOSITION, HAVING A LAYER OF GLASS AND A SURFACE REGION WITH A CONTACT ANGLE FOR WETTING WITH WATER

BACKGROUND OF THE INVENTION

1. Field of the Disclosure

The present invention relates to a hollow body, and more particularly to a hollow body with a wall which at least partially surrounds an interior volume of the hollow body. Further, the invention relates to a process for making an item; a hollow body obtainable by this process; a closed container; a process for packaging a pharmaceutical composition; a closed hollow body obtainable by this process; a use of one of the hollow body; and a use of a perfluorinated silane or a perfluorosulfonic acid or both.

2. Background

Containers made from glass have been applied for transporting fluids and powders safely for several centuries. In the last decades, the arts in which glass containers are used for transporting fluids and powders have become increasingly diverse and sophisticated. One such art is the technical field of the present disclosure—pharmaceutical packaging. In the pharmaceutical industry, glass containers such as vials, syringes, ampules and cartridges are applied as primary packaging for all kinds of pharmaceutically relevant compositions, in particular drugs such as vaccines. Specifically in this art, the requirements put on the glass containers have become more and more sophisticated recently.

Glass containers for pharmaceutical packaging are typically cleaned, sterilized, filled and closed, partially lyophilized, on an industrial scale in a line of processing, referred to as filling line in this document. There is a need to increase a production rate of such a filling line in the art. This may be implemented by increasing a velocity of the filling line and/or by reducing shut down times due to disruptions of the processing. In the prior art, such disruptions are typically caused by the occurrence of breakage of glass containers during processing, in particular due to high transportation velocities on the filling line. If such breakage occurs, production has to be stopped, the line has to be cleaned thoroughly from particles and dust and then the system has to be readjusted before it is started again. Contamination of the glass containers with any kind of pharmaceutically relevant particles, in particular glass particles, has to be avoided strictly, in particular if parenterals are packaged.

Further, scratching of the surface or glass surface of the containers has to be avoided as far as possible. Scratches on the container surface may hamper an optical inspection of the filled containers, in particular for the presence of pharmaceutically relevant particles. Further, scratching can lead to glass particles or dust being disassociated from the containers. These particles and dust may contaminate the containers on the filling line.

In the prior art, attempts to solve the above problems by applying a coating to the container surface are known. The requirements on such coatings are rather sophisticated. They have to withstand high temperatures which occur in a sterilization treatment referred to in the art as depyrogenation. Further, the coatings have to withstand low temperature treatments such as freeze drying. Even more, the coatings have to withstand washing processes which include increased temperatures and mechanical influences.

It is known, in the prior art, to provide a silicone coating to the glass container exterior surface. Such a coating needs to be cured, which may be effected incompletely. Contamination of the container interior may result. Such contamination with silicone is, however, inacceptable for the packaging of certain pharmaceuticals. Further, this coating represents only a temporary means which is used to mitigate the above deleterious effects only in certain processing steps. Afterwards, the silicone coating is removed via treatment with a caustic solution. This removal, however, represents an auxiliary process step which renders to overall packaging process more laborious, complicated and lengthy.

In DE 10 2009 042 159 A1, providing inorganic nanoparticles of $SiO_2$ on the exterior glass container surface is proposed in order to improve tribological characteristics of the container. Practical experience has, however, shown that the scratch resistance of the container surface is not significantly improved by this measure. Further, the above described incidents on the filling line are not mitigated sufficiently.

What is needed in the art is a way of reducing the risk of contamination of pharmaceutical packaging.

SUMMARY OF THE INVENTION

The present disclosure provides a hollow body with a wall which at least partially surrounds an interior volume of the hollow body. The wall comprises a layer of glass, and has a wall surface with a surface region characterized by a contact angle for wetting with water of at least 80°.

The hollow body may be a glass container for pharmaceutical packaging which allows for an increase of a production rate of a filling line. The glass container for pharmaceutical packaging may allow for an increase of a processing speed of a filling line, or for a reduction of disruptions of a filling line, or both. The glass container for pharmaceutical packaging may show a reduced tendency to being damaged or even broken while being processed on a filling line. The glass container for pharmaceutical packaging may show an improved scratch resistance.

According to another exemplary embodiment of the invention, one of the previously described containers is provided, wherein the container is further suitable for an easy and reliable optical inspection after having been filled. The container may be further suitable for a post-treatment; such as a sterilization treatment, which may be effected as a high-temperature-treatment—in particular a depyrogenation—or as a washing process; and a low-temperature-treatment—in particular a freeze drying. In some embodiments, the container does not show an increased tendency to being contaminated in a pharmaceutically relevant manner and the container may show a reduced tendency to being contaminated. The preceding contamination refers, in particular, to the presence of pharmaceutically relevant particles in the container interior.

Some exemplary embodiments of a hollow body include a wall which at least partially surrounds an interior volume of the hollow body. The wall comprises a layer of glass, and has a wall surface. The wall surface comprises a surface region which is characterized by a contact angle for wetting with water of at least 80°, such as at least 85°, at least 90°, at least 95°, at least 100°, at least 105°, or at least 110°. The surface region may superimpose the layer of glass. The layer of glass may extend throughout the wall. The wall may be made from the glass to an extent of at least 50 wt.-%, such as 60 wt.-%, 70 wt.-%, 80 wt.-%, 90 wt.-%, 95 wt.-%, or 99 wt.-%, in each case based on the total weight of the wall.

In some embodiments, the wall surface comprises an interior surface which faces the interior volume, and an exterior surface which faces away from the interior volume; wherein the interior surface, or the exterior surface, or both comprises the surface region. The wall surface may consist of the interior surface and the exterior surface. The exterior surface may comprise the surface region at least partially, or the exterior surface may comprise the surface region completely. In some embodiments, the interior surface does not comprise any part of the surface region. In some embodiments, no part of the interior surface is characterized by a contact angle for wetting with water of at least 80°, such as at least 85°, at least 90°, at least 95°, at least 100°, at least 105°, or at least 110°.

In some embodiments, the wall surface comprises an interior surface which faces the interior volume, and an exterior surface which faces away from the interior volume; the exterior surface comprises the surface region; and the interior surface is characterized across its full area by a contact angle for wetting with water of less than 80°, such as less than 75°, less than 70°, less than 60°, less than 50°, less than 40°, less than 30°, less than 20°, or less than 10°.

In some embodiments, the interior volume is in a range from 0.5 to 100 ml, such as from 1 to 100 ml, from 1 to 50 ml, from 1 to 10 ml, or from 2 to 10 ml.

In some embodiments, the hollow body is a container.

The container may be a packaging container for a medical or a pharmaceutical packaging good or both. One exemplary pharmaceutical packaging good is a pharmaceutical composition. The container may be suitable for packaging parenterals in accordance with section 3.2.1 of the European Pharmacopoeia, 7th edition from 2011.

In some embodiments, the container is one selected from the group consisting of a vial, a syringe, a cartridge, and an ampoule; or a combination of at least two thereof.

In some embodiments, the wall comprises from top to bottom of the hollow body a top region; a body region, which follows the top region via a shoulder; and a bottom region, which follows the body region via a heel.

The body region may be a lateral region of the hollow body. The body region of the wall may form a hollow cylinder. The top region of the wall may comprise from top to bottom of the wall a flange and a neck. The body region of the wall may comprise the surface region at least partially, or completely. The surface region may form 10 to 100%, such as from 20 to 100%, from 30 to 100%, from 40 to 100%, from 50 to 100%, from 60 to 100%, from 70 to 100%, from 80 to 100%, or from 90 to 100%, of a total area of the exterior surface or the interior surface or both, in each case in the body region of the wall.

In some embodiments, throughout the body region a thickness of the layer of glass is in a range from ±0.3 mm, such as ±0.2 mm, ±0.1 mm, or ±0.08 mm, in each case based on a mean value of this thickness in the body region of the wall.

In some embodiments, throughout the body region a thickness of the layer of glass is in a range from 0.2 to 5 mm, such as from 0.4 to 3 mm, from 0.5 to 2 mm, or from 0.6 to 1.5 mm.

In some embodiments, the glass is of a type selected from the group consisting of a type I glass, an aluminosilicate glass, and fused silica; or of a combination of at least two thereof.

In some embodiments, the surface region is further characterized by a contact angle for wetting with n-hexadecane of at least 30°, such as at least 35°, at least 40°, at least 45°, or at least 50°.

In some embodiments, the wall further comprises a functionalizing composition, wherein the functionalizing composition at least partially superimposes the layer of glass, wherein the functionalizing composition comprises an organic compound, wherein the organic compound comprises F. The surface region may be a surface of the functionalizing composition.

In some embodiments, the organic compound further comprises S or Si or both.

In some embodiments, the organic compound is a silane or an acid or both.

In some embodiments, the functionalizing composition comprises the organic compound in a proportion in a range from 50 to 100 wt.-%, such as from 60 to 100 wt.-%, from 70 to 100 wt.-%, from 80 to 100 wt.-%, or from 90 to 100 wt.-%, in each case based on the weight of the functionalizing composition. The functionalizing composition may consist of the organic compound.

In some embodiments, the functionalizing composition at least partially adjoins the layer of glass. The functionalizing composition may adjoin the layer of glass across at least 50%, such as at least 60%, at least 70%, at least 80%, at least 90%, or at least 95%, in each case of a total surface area of the functionalizing composition facing away from the layer of glass. In some embodiments, no coupling agent or primer or both is present between the layer of glass and the functionalizing composition.

In some embodiments, a thickness of the functionalizing composition is in a range from 0.1 to 500 nm, such as from 0.1 to 300 nm, from 0.1 to 100 nm, or from 0.1 to 50 nm. The functionalizing composition may form a mono-molecular layer.

In some embodiments, the functionalizing composition comprises N in a range from 0 to 15 wt.-%, such as from 0 to 14 wt.-%, from 0 to 13 wt.-%, from 0 to 12 wt.-%, from 1 to 12 wt.-%, from 2 to 12 wt.-%, from 3 to 12 wt.-%, from 4 to 12 wt.-%, preferably from 5 to 12 wt.-%, or from 6 to 11 wt.-%, in each case based on the functionalizing composition.

In some embodiments, the functionalizing composition superimposes the layer of glass at 5 to 50%, such as 5 to 40%, 10 to 30%, or 10 to 25%, in each case of an area of the surface region.

In some embodiments, the functionalizing composition forms regions which each have a diameter in a range from 1 to 100 µm, such as from 1 to 50 µm, or from 3 to 20 µm.

In some embodiments, the wall further comprises a plurality of particles, wherein the plurality of particles superimposes the layer of glass. The plurality of particles may superimpose the layer of glass on a side of the layer of glass which faces towards the surface region. The plurality of particles may superimpose the layer of glass towards the interior surface, or the exterior surface, or both. In some embodiments, the plurality of particles superimposes the layer of glass on the same side of the layer of glass as the functionalizing composition. The plurality of particles may superimpose the layer of glass at least partially in the body region, such as throughout the body region, of the wall.

In some embodiments, the plurality of particles is at least partially superimposed by the surface area, such as on a side of the plurality of particles facing away from the surface of glass. The plurality of particles may be at least partially superimposed by the functionalizing composition, such as on a side of the plurality of particles facing away from the surface of glass.

In some embodiments, the particles of the plurality of particles are inorganic particles.

In some embodiments, the inorganic particles are selected from the group consisting of a boron nitride, molybdenum sulphide, such as $MoS_2$, a silicon nitride, such as $Si_3N_4$, and an oxide; or a combination of at least two thereof. An exemplary oxide is a silicon oxide or a titanium oxide or both. An exemplary silicon oxide is $SiO_2$. An exemplary titanium oxide is $TiO_2$.

In some embodiments, the plurality of particles superimposes the layer of glass at 1 to 80%, such as at 1 to 70%, at 1 to 60%, at 5 to 60%, at 10 to 60%, at 20 to 60%, in each case of a total surface area of the surface region.

In some embodiments, the plurality of particles is characterized by a particle size distribution having a $D_{50}$ in a range from 10 to 500 nm. The $D_{50}$ may be less than 300 nm, such as less than 150 nm or less than 100 nm.

In some embodiments, the plurality of particles is characterized by a particle size distribution having a full width at half maximum (FWHM) which is less than 30%, such as less than 25%, less than 20%, less than 15%, or less than 10%, in each case of a $D_{50}$ of the particle size distribution.

In some embodiments, the particles of the plurality of particles are characterized by an aspect ratio in a range from 0.5 to 1.5, such as from 0.6 to 1.4, from 0.7 to 1.3, from 0.8 to 1.2, or from 0.9 to 1.1. The particles of the plurality of particles may be spherical.

In some embodiments, the hollow body has a transmission coefficient for a transmission of light of a wavelength in a range from 400 nm to 2300 nm, such as from 400 to 500 nm, or from 430 to 490 nm, through the hollow body via the surface region of more than 0.7, such as more than 0.75, more than 0.8 or more than 0.82. The transmission coefficient may hold for light of each wavelength in the range from 400 nm to 2300 nm, such as from 400 to 500 nm, or from 430 to 490 nm. The hollow body may have a first transmission coefficient for a transmission of light of a wavelength in a range from 400 nm to 2300 nm, such as from 400 to 500 nm, or from 430 to 490 nm, through the hollow body not via the surface region, and a further transmission coefficient for a transmission of light of a wavelength in a range from 400 nm to 2300 nm, such as from 400 to 500 nm, or from 430 to 490 nm, through the hollow body via the surface region, wherein a ratio of the first transmission coefficient to the further transmission coefficient n is in a range from 0.99 to 1.01, such as from 0.995 to 1.005.

In some embodiments, the hollow body has a haze for a transmission of light through the hollow body via the surface region in a range from 15 to 22%, such as from 15 to 21.7%, from 15 to 21.6%, from 18 to 21.5%, from 18 to 21.4%, from 18 to 21.3%, from 18 to 21.2%, from 18 to 21.1%, from 18 to 21%, from 18 to 20.8%, from 18 to 20.6%, from 18 to 20.4%, or from 18 to 20.2%. The hollow body may have a first haze for a transmission of light through the hollow body not via the surface region, and a further haze for a transmission of light through the hollow body via the surface region, wherein the further haze is in a range from 99.7 to 100.3%, such as from 99.8 to 100.2%, from 99.9 to 100.1%, or from 100 to less than 100.1%, in each case of the first haze. In some embodiments, the further haze is less than 100%, such as less than 99.9%, less than 99.8%, less than 99.5%, less than 99%, less than 98.5%, less than 98%, less than 97%, less than 96%, less than 95%, less than 94%, or less than 93%, in each case of the first haze. The above haze values may refer to a hollow body having an interior volume of about 2 ml and to a transmission of the light through a part of the hollow body which is of the shape of a hollow cylinder.

In some embodiments, towards the interior volume the interior surface is at least partially superimposed by an alkali metal barrier layer or by a hydrophobic layer or both. The alkali metal barrier layer may consist of any material or any combination of materials suitable for providing a barrier action against migration of an alkali metal ion, such as against any alkali metal ion. The alkali metal barrier layer may be of a multilayer structure.

The alkali metal barrier layer may comprise $SiO_2$, such as a layer of $SiO_2$. Further, the hydrophobic layer may consist of any material or any combination of materials which provides a layer surface towards the interior volume which has a contact angle for wetting with water of more than 90°. The hydrophobic layer may allow for the formation of a well-defined cake upon freeze-drying, in particular in terms of a shape of the cake. An exemplary hydrophobic layer comprises a compound of the general formula $SiO_xC_yH_z$, such as a layer of this compound. Therein, x is a number which is less than 1, such as in a range from 0.6 to 0.9, or from 0.7 to 0.8; y is a number in a range from 1.2 to 3.3, such as from 1.5 to 2.5; and z is a number as well.

In some embodiments, the interior volume comprises a pharmaceutical composition.

In some embodiments, the functionalizing composition has an N-content of less than 5.0 at.-%, such as less than 4.5 at.-%, less than 4.0 at.-%, less than 3.5 at.-%, less than 3.0 at.-%, less than 2.5 at.-%, not more than 2.0 at.-%, or less than 2.0 at.-%. The preceding N-content is determined according to the test method described herein.

In some embodiments, at least in the surface region the wall surface has an N-content of less than 5.0 at.-%, such as less than 4.5 at.-%, less than 4.0 at.-%, less than 3.5 at.-%, less than 3.0 at.-%, less than 2.5 at.-%, not more than 2.0 at.-%, or less than 2.0 at.-%. The preceding N-content is determined according to the test method described herein. The exterior surface may have an N-content in one of the preceding ranges across at least 50%, such as at least 60%, at least 70%, at least 80%, at least 90%, at least 95%, or 100%, of a total surface area of the exterior surface. The interior surface may have an N-content in one of the preceding ranges across at least 50%, such as at least 60%, at least 70%, at least 80%, at least 90%, at least 95%, or 100%, of a total surface area of the interior surface.

A process of making an item is also provided that includes:
a) providing a hollow body, comprising a wall which at least partially surrounds an interior volume of the hollow body, wherein the wall
  i) comprises a layer of glass, and
  ii) has a wall surface;
b) superimposing at least a part of the layer of glass with a functionalizing composition precursor, comprising
  i) an organic compound comprising F, and
  ii) a vehicle;
  and
c) decreasing a proportion of the vehicle in the functionalizing composition precursor, thereby obtaining a functionalizing composition which at least partially superimposes the layer of glass in a functionalized region.

Therein, the functionalized region may be functionalized in that the layer of glass is superimposed by the functionalizing composition in that region. In step c) the proportion of the vehicle in the functionalizing composition precursor may be decreased by a value in the range from 70 to 99.99 wt.-%, such as from 75 to 99.99 wt.-%, from 80 to 99.95 wt.-%, from 90 to 99.95 wt.-%, or from 95 to 99.95 wt.-%, in each case based on the total weight of the functionalizing composition precursor in process step b). The decreasing in the process step c) may comprise heating the layer of glass at least partially to a temperature in a range from 20 to 250° C., such as from 80 to 200° C., or from 100 to 175° C. The preceding temperature may be kept in the preceding range for a duration in a range from 0.1 to 60 min, such as from 1 to 30 min, or from 5 to 15 min.

In some embodiments, the wall surface comprises
a. an interior surface which faces the interior volume, and
b. an exterior surface which faces away from the interior volume.

In the process step b) the layer of glass may be superimposed with the functionalizing composition precursor on the interior surface, or the exterior surface, or both. The interior surface, or the exterior surface, or both may comprise the functionalized region. The wall surface may consist of the interior surface and the exterior surface. In some embodiments, in the process step b) the layer of glass is superimposed with the functionalizing composition precursor on at least a part of the exterior surface, preferably across the full exterior surface. In some embodiments, the exterior surface comprises the functionalized region at least partially, such as the exterior surface comprises the functionalized region completely. In some embodiments, the interior surface does not comprise any part of the functionalized region. In some embodiments, in the process step b) the layer of glass is not superimposed with the functionalizing composition precursor on any part of the interior surface.

In some embodiments, the item is the previously described hollow body. The hollow body which is provided in the process step a) may be a precursor of the hollow body.

In some embodiments, the organic compound further comprises S or Si or both.

In some embodiments, the organic compound is a silane or an acid or both.

In some embodiments, the functionalizing composition precursor comprises the organic compound to a proportion in a range from 0.01 to 30 wt.-%, such as from 0.01 to 25 wt.-%, from 0.05 to 20 wt.-%, from 0.1 to 5 wt.-%, or from 0.1 to 3 wt.-%, in each case based on the total weight of the functionalizing composition precursor in the process step b).

In some embodiments, in the process step b) the layer of glass is contacted with the functionalizing composition precursor.

In some embodiments, the functionalizing composition precursor further comprises an additive selected from the group consisting of a dispersing agent, a stabiliser, and a chemical bonding agent, or a combination of at least two thereof. An exemplary stabiliser has a viscosity in a range from 5 to 100 cst. An exemplary chemical bonding agent is an alkoxysilane.

In some embodiments, the vehicle is an organic vehicle or an inorganic vehicle or both. An exemplary organic vehicle comprises alkyl groups with less than 7 C-atoms. The organic vehicle may be an alcohol. Exemplary alcohols are ethanol or isopropanol or both. An exemplary inorganic vehicle is water. The vehicle may be a solvent.

In some embodiments, the process step b) or c) or both comprises adjusting, such as increasing, a contact angle for wetting with water of a surface region of the wall surface to at least 80°, such as at least 85°, at least 90°, at least 95°, at least 100°, at least 105°, or at least 110°.

In some embodiments, the process step b) or c) or both comprises adjusting, such as increasing, a contact angle for wetting with n-hexadecane of a surface region of the wall surface to at least 30°, such as at least 35°, at least 40°, at least 45°, or at least 50°.

In some embodiments, prior to the process step b) the process comprises a step of at least partially decreasing a contact angle for wetting with water of the wall surface by a surface-treatment. The contact angle for wetting with water may be decreased across the full interior surface or exterior surface or both. In some embodiments, the contact angle for wetting with water is decreased across the full wall surface by the surface-treatment. Further, the contact angle for wetting with water of the wall surface may be at least partially decreased to less than 30°, such as less than 20°, or less than 10°.

In some embodiments, the surface-treatment is selected from the group consisting of a plasma treatment, a flame treatment, a corona treatment, and a wet chemical treatment; or a combination of at least two thereof. An exemplary plasma treatment comprises contacting the surface of glass with an O-plasma.

In some embodiments, in the process step b) the functionalizing composition precursor has a pH in a range from 4 to 8, such as from 4 to 7, from 4 to 6, or from 4 to 5.

In some embodiments, the superimposing in the process step b) comprises one selected from the group consisting of a spraying, a dipping, and a printing; or a combination of at least two thereof. An exemplary printing is a contact printing or a contact-less printing or both. An exemplary contact printing is a tampon printing or a screen printing or both. An exemplary contact-less printing is an inkjet printing.

In some embodiments, in the process step b) or c) or in both the wall surface is functionalized in a surface region of the wall surface, and in the process step a) the hollow body has a first transmission coefficient for a transmission of light of a wavelength in a range from 400 nm to 2300 nm, such as from 400 to 500 nm, from 430 to 490 nm, through the hollow body via the surface region. After the process step c) the hollow body has a further transmission coefficient for a transmission of light of a wavelength in a range from 400 nm to 2300 nm, such as from 400 to 500 nm, from 430 to 490 nm, through the hollow body via the surface region, wherein a ratio of the first transmission coefficient to the further transmission coefficient is in a range from 0.99 to 1.01, such as from 0.995 to 1.005. The first and the further coefficients of transmission may hold for light of each wavelength in the range from 400 nm to 2300 nm, such as from 400 to 500 nm, or from 430 to 490 nm. The further transmission coefficient may be more than 0.7, such as more than 0.75, more than 0.8, or more than 0.82.

In some embodiments, wherein in the process step b) or c) or in both the wall surface is functionalized in a surface region of the wall surface, and in the process step a) the hollow body has a first haze for a transmission of light through the hollow body not via the surface region, and after the process step c) the hollow body has a further haze for a transmission of light through the hollow body via the surface region, the further haze being in a range from 99.7 to 100.3%, such as from 99.8 to 100.2%, from 99.9 to 100.1%, or from 100 to less than 100.1%, in each case of the first haze. In some embodiments, the further haze is less than 100%, such as less than 99.9%, less than 99.8%, less than 99.5%, less than 99%, less than 98.5%, less than 98%, less than 97%, less than 96%, less than 95%, less than 94%, or less than 93%, in each case of the first haze. The further haze may be in a range from 15 to 22%, such as from 15 to 21.7%, from 15 to 21.6%, from 18 to 21.5%, from 18 to 21.4%, from 18 to 21.3%, from 18 to 21.2%, from 18 to 21.1%, from 18 to 21%, from 18 to 20.8%, from 18 to 20.6%, from 18 to 20.4%, or from 18 to 20.2%. The above haze values may refer to a hollow body having an interior volume of about 2 ml and to a transmission of the light through a part of the hollow body which is of the shape of a hollow cylinder.

In some embodiments, the functionalizing composition precursor further comprises a plurality of particles.

In some embodiments, in the process step b) the functionalizing composition precursor comprises the plurality of particles at a proportion in a range from 0.1 to 25 wt.-%, such as from 0.1 to 20 wt.-%, from 0.1 to 15 wt.-%, or from 1 to 8 wt.-%, in each case based on the weight of the functionalizing composition precursor.

In some embodiments, prior to the process step b) the layer of glass is at least partially superimposed by, such as contacted with, a plurality of particles at the at least part of the layer of glass.

In some embodiments, the particles of the plurality of particles are inorganic particles.

In some embodiments, the inorganic particles comprise, or may consist of, one selected from the group consisting of a boron nitride, molybdenum sulphide, such as $MoS_2$, a silicon nitride, such as $Si_3N_4$, and an oxide; or a combination of at least two thereof. An exemplary oxide is a silicon oxide or a titanium oxide or both. An exemplary silicon oxide is $SiO_2$. An exemplary titanium oxide is $TiO_2$.

In some embodiments, the plurality of particles is characterized by a particle size distribution having a $D_{50}$ in a range from 10 to 500 nm, such as from 10 to less than 300 nm, from 10 to less than 150 nm, or from 10 to less than 100 nm.

In some embodiments, the plurality of particles is characterized by a particle size distribution having a full width at half maximum which is less than 30%, such as less than 25%, less than 20%, less than 15%, or less than 10%, in each case of a $D_{50}$ of the particle size distribution.

In some embodiments, the particles of the plurality of particles are characterized by an aspect ratio in a range from 0.5 to 1.5, such as from 0.6 to 1.4, from 0.7 to 1.3, from 0.8 to 1.2, or from 0.9 to 1.1. The particles of the plurality of particles may be spherical.

In some embodiments, the process further comprises a process step d) of heating the wall surface at least partially to at least 200° C., such as at least 250° C., at least 300° C., or at least 320° C. The preceding temperature may be kept constant for a duration of at least 3 min, such as at least 5 min, at least 10 min, at least 30 min, or at least 1 h. The preceding duration may be up to several days, 48 h, or 24 h. The interior surface or the exterior surface or both, such as the full wall surface, may be heated in the process step d) as previously described. The heating in the process step d) may be a measure of a depyrogenation step. In the technical field of pharmacy, depyrogenation is a step of decreasing an amount of pyrogenic germs on a surface, such as via a heat-treatment. Therein, the amount of pyrogenic germs on the surface may be decreased as much as possible, such as by at least 80%, at least 90%, at least 95%, at least 99%, at least 99.5%, or by 100%, in each case based on an amount of the pyrogenic germs on the surface prior to the depyrogenation.

In some embodiments, the previously described hollow body is provided utilizing the previously described process.

In some embodiments, a closed container is provided that comprises a wall. The wall at least partially surrounds an interior volume which comprises a pharmaceutical composition. The wall comprises a layer of glass, and has a wall surface comprising a surface region which faces away from the interior volume, and is characterized by a contact angle for wetting with water of at least 80°, such as at least 85°, at least 90°, at least 95°, at least 100°, at least 105°, or at least 110°.

In some embodiments of the closed container, it shows the technical features of the previously described hollow body.

In some embodiments, a process is provided that comprises as process steps:
  A) providing the previously described hollow body;
  B) inserting a pharmaceutical composition into the interior volume; and
  C) closing the hollow body.

The closing in the process step C) may comprise contacting the hollow body with a closure, such as a lid, covering an opening of the hollow body with the closure, and joining the closure to the hollow body. The joining may comprise creating a form-fit of the hollow body, such as the flange of the hollow body, with the closure. The form-fit may be created via a crimping step. The process can be a process for packaging the pharmaceutical composition.

The closed hollow body may obtained by the previously described process.

In some embodiments, a process is provided comprising as process steps:
  A. providing the hollow body, the closed container, or the closed hollow body; and
  B. administering the pharmaceutical composition to a patient.

In some embodiments, a use of the previously described hollow body is provided for packaging a pharmaceutical composition. The packaging may comprise inserting the pharmaceutical composition into the interior volume and closing the hollow body.

In some embodiments, a use of a perfluorinated silane or a perfluorosulfonic acid or both for functionalizing a surface of glass of a container, such as an exterior surface of the container, is provided. The functionalizing may be conducted according to the previously described process, wherein the perfluorinated silane or a perfluorosulfonic acid or both is the organic composition. An exemplary container is a pharmaceutical packaging container, which may be one selected from the group consisting of a vial, a syringe, a cartridge, and an ampoule; or a combination of at least two thereof.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 7 shows a flow chart of a process provided according to the invention for packaging a pharmaceutical composition;

FIG. 8A shows a microscope image of the result of a scratch test performed on a vial of comparative example 1;

FIG. 8B shows a microscope image of the result of a scratch test performed on a vial of example 1;

FIG. 8C shows a microscope image of the result of a scratch test performed on a vial of example 5;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Hollow Body

Figure 1:
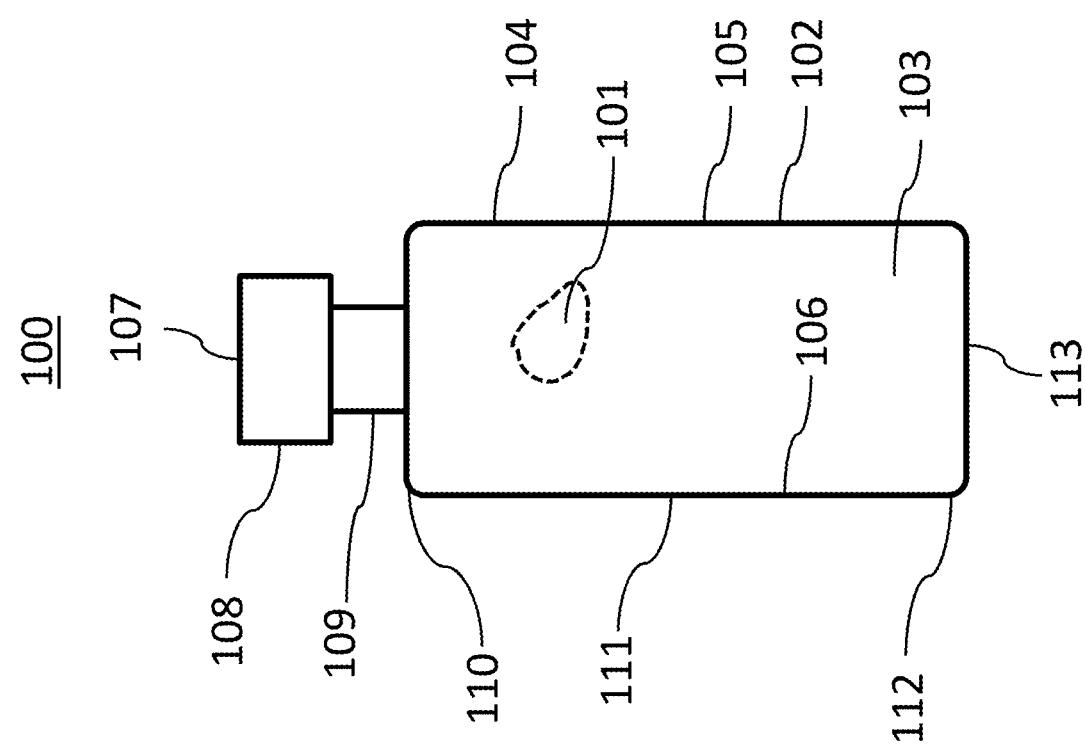
FIG. 1 shows a schematic depiction of a hollow body provided according to the invention.

The hollow body provided according to the invention may have any appropriate size or shape. The head region of the hollow body may comprise an opening, which allows for inserting a pharmaceutical composition into the interior volume of the hollow body. In that case, the wall surrounds the interior volume of the hollow body only partially. The hollow body may be a glass body or a glass container in the sense that the layer of glass extends over the full area of the wall surface. In that case, the layer of glass determines a macroscopic shape of the wall. The layer of glass may be of a one-piece design. The layer of glass of such a glass body or a glass container may be made by blow moulding a glass melt; or by preparing a tube of a glass, such as in form of a hollow cylinder, forming the bottom of the hollow body from one end of the tube, thereby closing the tube at this end, and forming the head region of the hollow body from the opposite end of the tube. According to the nomenclature used herein, the wall of the hollow body comprises the layer of glass and every layer and every functionalization superimposed thereon. The wall surface is formed by the surface of the layer or functionalization which is positioned at an outermost or innermost position of the wall.

As used herein, the interior volume represents the full volume of the interior of the hollow body. This volume may be determined by filling the interior of the hollow body with water up to the brim and measuring the volume of the amount of water which the interior can take up to the brim. Hence, the interior volume as used herein is not a nominal volume as it is often referred to in the technical field of pharmacy. This nominal volume may, for example, be less than the interior volume by a factor of about 0.5.

Glass

The glass of the layer of glass may be any type of glass and may consist of any material or combination of suitable materials. The glass may be suitable for pharmaceutical packaging. In some embodiments, the glass is of type I in accordance with the definitions of glass types in section 3.2.1 of the European Pharmacopoeia, $7^{th}$ edition from 2011. In some embodiments, the glass is selected from the group consisting of a borosilicate glass, an aluminosilicate glass, and fused silica; or a combination of at least two thereof. As used herein, an aluminosilicate glass is a glass which has a content of $Al_2O_3$ of more than 8 wt.-%, such as more than 9 wt.-% and/or in a range from 9 to 20 wt.-%, in each case based on the total weight of the glass. An exemplary aluminosilicate glass has a content of $B_2O_3$ of less than 8 wt.-%, such as at maximum 7 wt.-% and/or in a range from 0 to 7 wt.-%, in each case based on the total weight of the glass. As used herein, a borosilicate glass is a glass which has a content of $B_2O_3$ of at least 1 wt.-%, such as at least 2 wt.-%, at least 3 wt.-%, at least 4 wt.-%, at least 5 wt.-% and/or in a range from 5 to 15 wt.-%, in each case based on the total weight of the glass. An exemplary borosilicate glass has a content of $Al_2O_3$ of less than 7.5 wt.-%, such as less than 6.5 wt.-%, and/or in a range from 0 to 5.5 wt.-%, in each case based on the total weight of the glass. In some embodiments, the borosilicate glass has a content of $Al_2O_3$ in a range from 3 to 7.5 wt.-%, such as in a range from 4 to 6 wt.-%, in each case based on the total weight of the glass.

A glass which may be used is essentially free from B. Therein, the wording "essentially free from B" refers to glasses which are free from B which has been added to the glass composition by purpose. This means that B may still be present as an impurity, but at a proportion of not more than 0.1 wt.-%, such as not more than 0.05 wt.-%, in each case based on the weight of the glass.

Silane

Any suitable silane may be used. An exemplary silane that may be used is a perfluorinated silane. An exemplary perfluorinated silane is a fluoroalkylsilane. An exemplary fluoroalkylsilane is a perfluorooctanesulfonylpropyltriethyloxysilane, a 1H,1H,2H,2H-Perfluorododecyltrimethoxysilane, a 1H,1H,2H,2H-Perfluorooctyltriethoxysilane; or a combination of at least two thereof. Other exemplary perfluorinated silanes are commercially available under the tradenames Dynasylan® F8261, Dynasylan® F8263, Dynasylan® F8815, Dynasylan® SIVO 121, Dynasylan® SIVO Clear, Dynasylan® SIVO Clear EC, and EKG6051 activator.

Acid

Any suitable acid may be used. An exemplary acid is a Lewis acid or a Brønsted-Lowry acid or both. Another exemplary acid is an acid comprising S. An exemplary acid which comprises S is a sulfonic acid. An exemplary sulfonic acid is perfluorooctanesulfonic acid (PFOS).

Functionalizing Composition Precursor

The functionalizing composition precursor is a precursor of the functionalizing composition. The functionalizing composition may be obtainable from the functionalizing composition precursor by decreasing a proportion of the vehicle in the precursor, such as by drying the precursor. The proportion of the vehicle may be decreased to about 0 wt.-%, based on the weight of the remaining composition. The vehicle may be fluid at temperatures above 0° C.

Pharmaceutical Composition

Any suitable pharmaceutical composition may be used. A pharmaceutical composition is a composition comprising at least one active ingredient. An exemplary active ingredient is a vaccine. The pharmaceutical composition may be fluid or solid or both. A solid composition may be granular such as a powder, a multitude of tablets or a multitude of capsules. An exemplary pharmaceutical composition is a parenteral, i.e. a composition which is intended to be administered via the parenteral route, which may be any route which is not enteral. Parenteral administration can be performed by injection, e.g. using a needle (usually a hypodermic needle) and a syringe, or by the insertion of an indwelling catheter.

$D_{50}$

The $D_{50}$-value of a particle size distribution provides the particle diameter for which 50% of all particles of the plurality of particles having this particle size distribution have smaller diameters than this value. Herein, the diameter is the length of the longest straight line which starts and ends on the surface of the particle and which extends through the geometric centre of the particle.

Wall

Herein, the wall of the hollow body comprises a layer of glass. The wall may comprise further layers on one or both sides of the layer of glass. The layer of glass may extend laterally throughout the wall. This means that, in some embodiments, each point on the wall surface lies on top of a point of the layer of glass. The hollow body may be a hollow body of glass. In any case, the layers of the wall are joined to one another. Two layers are joined to one another when their adhesion to one another goes beyond van der Waals attraction forces. Unless otherwise indicated, the layers in a layer sequence may follow one another indirectly, in other words with one or at least two intermediate layers, or directly, in other words without an intermediate layer. This is particularly the case with the formulation wherein one layer superimposes another layer. Further, if an entity (e.g. composition precursor, particles) is superimposed onto a layer or a surface, this entity may be contacted with that layer or surface or it may not be contacted with that layer or surface, but be indirectly overlaid onto that layer or surface with another entity (e.g. a layer) in-between.

Measurement Methods

The following measurement methods are to be used in the context of the present invention. Unless otherwise specified, the measurements have to be carried out at an ambient temperature of 23° C., an ambient air pressure of 100 kPa (0.986 atm) and a relative atmospheric humidity of 50%.

Contact Angle for Wetting with Water and n-Hexadecane

The contact angle is determined in accordance with the standard DIN 55660, parts 1 and 2. The contact angle is determined using the static method. Deviating from the standard, the measurement is conducted at curved surfaces as the wall of the hollow body is usually curved. Further, the measurements are conducted at 22 to 25° C. ambient temperature and 20 to 35% relative atmospheric humidity. A Drop Shape Analyzer—DSA30S from Krüss GmbH is applied for the measurements. Uncertainty of the measurement increases for contact angles below 10°.

Wall Thickness and Tolerance of Wall Thickness

The wall thickness and deviations from the mean value of the wall thickness (tolerance) are determined in accordance with the following standards for the respective type of hollow body:

DIN ISO 8362-1 for vials,
DIN ISO 9187-1 for ampoules,
DIN ISO 11040-4 for syringes,
DIN ISO 13926-1 for cylindrical cartridges, and
DIN ISO 11040-1 for dental cartridges.

Transmission Coefficient

Herein, the transmission coefficients are defined as $T=I_{trans}/I_0$, wherein $I_0$ is the intensity of the light which is incident at a right angle on an incidence region of the surface region and $I_{trans}$ is the intensity of the light which leaves the hollow body on a side of the hollow body which is opposite to the incidence region. Hence, T refers to light which transmits the hollow body completely, i.e. one time through the wall into the interior volume and from there a second time through the wall out of the interior volume. Hence, the light transmits through two curved sections of the wall of the hollow body. The transmission coefficient is determined in accordance with the standard ISO 15368:2001(E), wherein an area of measurement of the dimensions 3 mm×4 mm is used. Further, the light is incident on the hollow body at a right angle to the vertical extension of the exterior surface of the hollow body. The transmission coefficients herein may refer to a hollow body of the type 2R according to DIN/ISO 8362 and to a transmission of the light through a part of the hollow body which is of the shape of a hollow cylinder.

Cover Ratio

Here, a topographical measurement of the surface to be studied is conducted with a white-light-spectrometer of the type Coherence Scanning Interferometry/Phase Shift Interferometry (CSI/PSI) from Zygo Corporation. The cover ratio is calculated from the obtained topographical image. The sum of the elevated areas is divided by the total area of measurement.

Particle Size Distribution

The particle size distribution is determined by dynamic light scattering (DLS). A Delsa™ Nano HC from Beckman Coulter is applied for the measurement. A sample of about 1 ml of the particles to be studied is taken. The sample is inserted into a plastic cuvette. If the sample is a dispersion which is very opaque, it is diluted until the laser intensity is above 10%. The sample is measured in accordance with the standard method of the measurement device. Therein, the algorithm calculates the diameter from 850 measurements. The standard software of the measuring device creates a diagram which shows the relative intensity of the measurements versus the particle diameter. The respective arithmetic mean and the standard deviation are provided by the software as well.

Haze

The haze is a measure for the opacity of a transparent sample, such as a glass sample. The value of the haze represents the fraction of light which has been transmitted through the sample, here the empty container, and which is scattered out of a certain spatial angle around the optical axis. Thus, the haze quantifies material defects in the sample which negatively affect transparency. Herein, the haze is determined according to the standard ASTM D 1033. In accordance with this standard, 4 spectra are measured and for each of them the transmission coefficient is calculated.

The haze value in % is calculated from these coefficients of transmission. A Thermo Scientific Evolution 600 spectrometer with integrating sphere and the software OptLab-SPX are applied for the measurements. In order to allow for measuring the diffusive transmission, the sample is positioned in front of the entrance of the integrating sphere. The reflection opening is left empty such that only the transmitted and scattered fraction of the incident light is detected. The fraction of the transmitted light which is not sufficiently scattered is not detected. Further measurements pertain to detection of the scattered light in the sphere (without sample) and to the overall transmission of the sample (reflection opening closed). All the measurement results are normalized to the overall transmission of the sphere without sample which is implemented as obligatory baseline correction in the software. Herein, the haze refers to light which transmits the hollow body completely, i.e. one time through the wall into the interior volume and from there a second time through the wall out of the interior volume. Hence, the light transmits through two curved sections of the wall of the hollow body. Further, the light is incident on the hollow body at a right angle to the vertical extension of the exterior surface of the hollow body. The hollow body may be a vial of the type 2R according to DIN/ISO 8362 and the transmission is conducted through a part of the hollow body which is of the shape of a hollow cylinder.

Scratch Test

An MCT MikroCombiTester from CSM MCT S/N 01-04488 is applied for the scratch test. The probe tip which is used as indenter is held by a special mount. For the test, the probe tip is moved forwards at an angle of 90° with respect to the surface to be tested underneath this surface, thereby scratching over the surface at a well-defined force. This test force is progressively increased from 0 to 30 N. The indenter is moved forwards at a velocity of 10 mm/min over a length of 15 mm, wherein the test force is progressively increased from 0 to 30 N (load rate 19.99 N/min). Afterwards, the scratched surface is checked with a microscope at a magnification of 5 times.

N-Content

The N-content of a surface or functionalizing composition is determined via XPS-analysis (XPS—X-ray photo electron spectroscopy). The measurements are conducted using a monochromatic X-ray spot having a diameter of 900 μm on the surface of the sample. The parameters of the depth profile are selected as 3 kV, 2×2 mm sputter spot, spot size 900 μm, 10 s/layer (equals 1.7 nm). Charging compensation is effected via standard magnetic mode (Argon$^+$ ions with magnetic field compensation). Sputtering is conducted long enough to ablate 100 nm. Hence, a depth profile which is 100 nm wide is obtained from each scan. For each sample 4 N1s-scans are conducted at 398.2 eV, 399.9 eV, 400.5 eV and 403.1 eV, respectively. In order to determine the N species detected in the preceding scans, the following reference N1s-binding energies are used:

| N-species | N1s binding energy [eV] |
| --- | --- |
| nitride | 396 to 398 |
| unprotonated aminofunctional groups | 398 to 399 |
| ammonium-N | 400 to 401 |
| weakly oxidised N | 401 to 403 |
| strongly oxidised N | 405 to 408 |

The signals of the 4 scans of a sample are summed up to obtain a sum signal which is converted to at.-%. The maximum of the sum signal over the 100 nm depth profile is determined. This maximum is the N-content in at.-% measured for the specific sample. 5 samples are studied as described above per each container. The arithmetic mean of the N-contents of the 5 samples is calculated as the overall N-content of the surface to be studied.

Example 1

According to the Invention

Preparation of Functionalizing Solution:

500 ml of isopropanol are provided in a beaker. 5 ml of 1H,1H,2H,2H-perfluorooctyltriethoxysilane from Sigma Aldrich are added to the beaker and the obtained composition is stirred for 2 h with a magnetic stirrer at ambient temperature of 20° C. The thus obtained solution is ready for use within the following 10 days. The solution should not be used after these 10 days have lapsed.

Functionalization with Solution:

A commercially available glass vial of the type "Vial 2.00 ml Fiolax clear" from Schott AG which of the type 2R according to DIN/ISO 8362 is provided. The surface of this vial does not have any coating or functionalization. This vial is washed as described below. The washed vial is immersed with its bottom first into the functionalizing solution, which has been prepared as set out above, at a velocity of 20 cm/min. Therein, the head region of the vial, including the vial opening, is not immersed into the solution in order to prevent contacting the interior surface of the vial with the solution. The vial is kept in the composition for 2 s. Afterwards, the vial is retracted from the solution at a velocity of 20 cm/min. Subsequently, the vial is kept as it is for 10 s at ambient temperature of 20° C. Then the vial is placed with its bottom onto an absorbent substrate such as a paper towel. Then the vial is dried for 10 min at 150° C. in an oven.

Example 2

According to the Invention

Preparation of Functionalizing Solution:

1,000 ml of the basic solution "EKx Grundlösung" from ETC Products GmbH, Germany, are provided in a beaker. 7 ml of the activator EKG6015 from ETC Products GmbH, Germany, are added and the obtained composition is stirred for 2 h with a magnetic stirrer at ambient temperature of 20° C. The thus obtained solution is ready for use within the following 10 days. The solution should not be used after these 10 days have lapsed.

Functionalization with Solution:

A commercially available glass vial of the type "Vial 2.00 ml Fiolax clear" from Schott AG which of the type 2R according to DIN/ISO 8362 is provided. The surface of this vial does not have any coating or functionalization. This vial is washed as described below. The washed vial is immersed with its bottom first into the functionalizing solution, which has been prepared as set out above, at a velocity of 30 cm/min. Therein, the head region of the vial, including the vial opening, is not immersed into the solution in order to prevent contacting the interior surface of the vial with the solution. The vial is kept in the composition for 2 s. Afterwards, the vial is retracted from the solution at a velocity of 10 cm/min. Subsequently, the vial is kept as it is for 10 s at ambient temperature of 20° C. Then the vial is placed with its bottom onto an absorbent substrate, such as a paper towel. Then the vial is dried for 10 min at 150° C. in an oven.

Example 3

According to the Invention

Preparation of Functionalizing Solution:

500 ml of isopropanol are provided in a beaker. 5 ml of 1H,1H,2H,2H-perfluorododecyltrimethoxysilane from Sigma Aldrich are added to the beaker and the obtained composition is stirred for 2 h with a magnetic stirrer at ambient temperature of 20° C. The thus obtained solution is ready for use within the following 10 days. The solution should not be used after these 10 days have lapsed.

Functionalization with Solution:

A commercially available glass vial of the type "Vial 2.00 ml Fiolax clear" from Schott AG which of the type 2R according to DIN/ISO 8362 is provided. The surface of this vial does not have any coating or functionalization. This vial is washed as described below. The washed vial is immersed with its bottom first into the functionalizing solution, which has been prepared as set out above, at a velocity of 50 cm/min. Therein, the head region of the vial, including the vial opening, is not immersed into the solution in order to prevent contacting the interior surface of the vial with the solution. The vial is kept in the composition for 1 s. Afterwards, the vial is retracted from the solution at a velocity of 5 cm/min. Subsequently, the vial is kept as it is for 10 s at ambient temperature of 20° C. Then the vial is placed with its bottom onto an absorbent substrate, such as a paper towel. Then the vial is dried for 30 min at the ambient temperature of 20° C. in an oven.

Example 4

According to the Invention

Preparation of Functionalizing Solution:

500 ml of Galden™ from Solvay are provided in a beaker. 10 ml of perfluorooctanesulfonylpropyltriethyloxysilane (concentration of 30%) from Wuhan Defu Economic Development Co. are added to the beaker and the obtained composition is stirred for 2 h with a magnetic stirrer at ambient temperature of 20° C. The thus obtained solution is ready for use within the following 10 days. The solution should not be used after these 10 days have lapsed.

Functionalization with Solution:

A commercially available glass vial of the type "Vial 2.00 ml Fiolax clear" from Schott AG which of the type 2R according to DIN/ISO 8362 is provided. The surface of this vial does not have any coating or functionalization. This vial is washed as described below. The washed vial is immersed with its bottom first into the functionalizing solution, which has been prepared as set out above, at a velocity of 30 cm/min. Therein, the head region of the vial, including the vial opening, is not immersed into the solution in order to prevent contacting the interior surface of the vial with the solution. The vial is kept in the composition for 1 s. Afterwards, the vial is retracted from the solution at a velocity of 20 cm/min. Subsequently, the vial is kept as it is for 10 s at ambient temperature of 20° C. Then the vial is placed with its bottom onto an absorbent substrate, such as a paper towel. Then the vial is dried for 10 min at 150° C. in an oven.

Example 5

According to the Invention

Preparation of First Functionalizing Solution:

99.8 ml of water are provided in a beaker and 0.2 ml of Levasil™ CS50-34P (having 50% of $SiO_2$ particles) are added. The thus obtained composition is stirred for 30 s with a magnetic stirrer at ambient temperature of 20° C. Subsequently, 0.5 ml of Tween20 are added and the composition is stirred for further 10 min. The thus obtained solution is ready for use.

Functionalization with First Functionalizing Solution:

A commercially available glass vial of the type "Vial 2.00 ml Fiolax clear" from Schott AG which of the type 2R according to DIN/ISO 8362 is provided. The surface of this vial does not have any coating or functionalization. This vial is washed as described below. The washed vial is immersed with its bottom first into the first functionalizing solution, which has been prepared as set out above, at a velocity of 30 cm/min. Therein, the head region of the vial, including the vial opening, is not immersed into the solution in order to prevent contacting the interior surface of the vial with the solution. The vial is kept in the composition for 2 s. Afterwards, the vial is retracted from the solution at a velocity of 20 cm/min. Subsequently, the vial is kept as it is for 10 s at ambient temperature of 20° C. Then the vial is placed with its bottom onto an absorbent substrate, such as a paper towel. Then a heat-treatment is conducted for 30 min at 600° C. in an oven. Afterwards, the vial is taken out of the oven and cooled down to the ambient temperature. The vial is ready for functionalizing with the second solution.

Preparation of Second Functionalizing Solution:

500 ml of isopropanol are provided in a beaker and 5 ml of 1H,1H,2H,2H-perfluorooctyltriethoxysilane from Sigma Aldrich are added. The thus obtained composition is stirred for 2 h with a magnetic stirrer at ambient temperature of 20° C., thereby obtaining a solution which is ready for use within the following 10 days. The solution should not be used after these 10 days have lapsed.

Functionalization with Second Functionalizing Solution:

The vial which has been functionalized with the first solution as described above is immersed with its bottom first into the second functionalizing solution at a velocity of 20 cm/min. Therein, the head region of the vial, including the vial opening, is not immersed into the solution in order to prevent contacting the interior surface of the vial with the solution. The vial is kept in the composition for 1 s. Afterwards, the vial is retracted from the solution at a velocity of 20 cm/min. Subsequently, the vial is kept as it is for 10 s at ambient temperature of 20° C. Then the vial is placed with its bottom onto an absorbent substrate, such as a paper towel. Then the vial is dried for 10 min at 150° C. in an oven.

Example 6

According to the Invention

Preparation of First Functionalizing Solution:

The first functionalizing solution is prepared as described for the example 5 above.

Functionalization with First Functionalizing Solution:

A commercially available glass vial of the type "Vial 2.00 ml Fiolax clear" from Schott AG which of the type 2R according to DIN/ISO 8362 is provided. The surface of this vial does not have any coating or functionalization. This vial is washed as described below. The washed vial is functionalized with the first functionalizing solution as described above for the example 5. The heat-treatment is, however, conducted for 30 min at 350° C. in order to obtain a vial which is ready for functionalizing with the second solution.
Preparation of Second Functionalizing Solution:
1,000 ml of the basic solution "EKx Grundlösung" from ETC Products GmbH, Germany, are provided in a beaker. 7 ml of the activator EKG6015 from ETC Products GmbH, Germany, are added and the obtained composition is stirred for 2 h with a magnetic stirrer at ambient temperature of 20° C. The thus obtained solution is ready for use within the following 10 days. The solution should not be used after these 10 days have lapsed.
Functionalization with Second Functionalizing Solution:
The vial which has been functionalized with the first solution as described above is functionalized with the second functionalizing solution as described above for the example 5. Here, however, the vial is immersed into the second functionalizing solution at a velocity of 10 cm/min.

Example 7

According to the Invention

Preparation of First Functionalizing Solution:
The first functionalizing solution is prepared as described for the example 5 above, wherein 90 ml of water and 10 ml of Levasil™ CS50-34P are used.
Functionalization with First Functionalizing Solution:
A commercially available glass vial of the type "Vial 2.00 ml Fiolax clear" from Schott AG is provided. The surface of this vial does not have any coating or functionalization. This vial is washed as described below. The washed vial is functionalized with the first functionalizing solution by the steps described above for the example 5.
Preparation of Second Functionalizing Solution:
The second functionalizing solution is prepared as described above for the example 5.
Functionalization with Second Functionalizing Solution:
The vial which has been functionalized with the first solution as described above is functionalized with the second functionalizing solution as described above for the example 5.

Comparative Example 1

Not According to the Invention

A commercially available glass vial of the type "Vial 2.00 ml Fiolax clear" from Schott AG which of the type 2R according to DIN/ISO 8362 is provided. The surface of this vial does not have any coating or functionalization.

Comparative Example 2

Not According to the Invention

A commercially available glass vial of the type "Vial 2.00 ml Fiolax clear" from Schott AG which of the type 2R according to DIN/ISO 8362 is coated on its exterior surface with MED10-6670 from NuSiL.

Comparative Example 3

Not According to the Invention

A glass vial of the type 2R according to DIN/ISO 8362 is coated on its exterior surface with polyimide.
Evaluation
For each of the examples 1 to 7 and the comparative examples 1 to 3, the contact angles for water and n-hexadecane are determined on the exterior surface of the vial body in accordance with the above measurement methods. Further, 10,000 of the vials of each example and comparative example, respectively, are processed on a standard pharmaceutical filling line and thus, filled with an influenza vaccine. Table 1 below shows the results of the contact angle measurements and an evaluation of the vials regarding their tendency to being damaged or even break on the filling line. Here, ++ means that no or only very few vials are being damaged or broken, + means that few vials are being damaged or broken, − means that damages to vials and broken vials occur more often than for +, −− means that damages to vials and broken vials occur more often than for −.

TABLE 1

Contact angles prior to any post treatment and tendency to being damages on the filling line

| Example | Contact angle water [°] | Contact angle n-hexadecane [°] | Low tendency to damages in filling line |
|---|---|---|---|
| Example 1 | 109 | 72 | + |
| Example 2 | 112 | 72 | ++ |
| Example 3 | 115 | 72 | ++ |
| Example 4 | 118 | 72 | ++ |
| Example 5 | 113 | 69 | ++ |
| Example 6 | 115 | 69 | ++ |
| Example 7 | 111 | 69 | ++ |
| Comparative example 1 | <10 | <10 | −− |
| Comparative example 2 | 70 | <10 | − |
| Comparative example 3 | 72 | <10 | − |

Further, the vials of the examples and comparative examples are studied for their optical characteristics which may influence an optical inspection of the vials, in particular for pharmaceutically relevant particles, after being filled with a vaccine and being closed. These studies are conducted prior to filling the vials. Here, the increase of the haze by the functionalization/coating and the transmission coefficient (T) of the vials for blue light of wavelength 450 nm are determined in accordance with the above measurement methods. The results are provided in Table 2 below. Column 3 shows the increase of the haze by the functionalization/coating with respect to the untreated vial which corresponds to comparative example 1.

TABLE 2

Optical characteriztics of the vials of the examples 1 to 7 and the comparative examples 1 to 3

| Example | Vial Diameter [mm] | Increase of haze [%] | T at 450 nm |
|---|---|---|---|
| Example 1 | 15.92 | <0.3 | 0.85 |
| Example 2 | 15.92 | <0.3 | 0.85 |
| Example 3 | 15.92 | <0.3 | 0.85 |
| Example 4 | 15.92 | <0.3 | 0.85 |
| Example 5 | 15.93 | <0.3 | 0.86 |
| Example 6 | 15.93 | <0.3 | 0.86 |
| Example 7 | 15.93 | <0.3 | 0.86 |
| Comparative example 1 | 16.01 | / | 0.85 |
| Comparative example 2 | 15.93 | 6 | 0.86 |
| Comparative example 3 | 16.66 | 3 | 0.74 |

Figure 14:
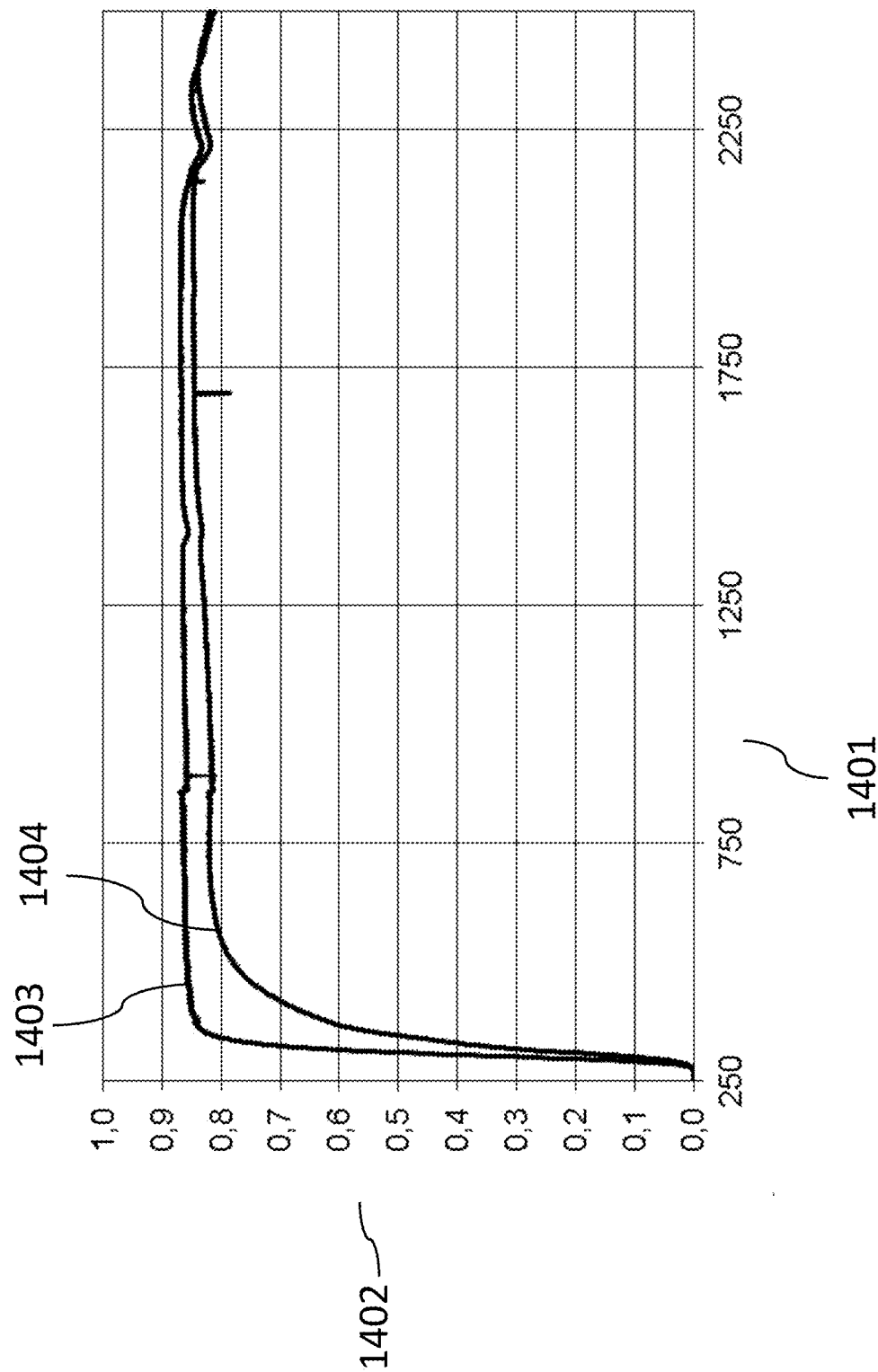
FIG. 14 shows results of measurements of the transmission coefficient of vials according to the examples 1 to 7 and the comparative examples 1 to 3.

In addition to Table 2, FIG. 14 shows the T for the empty vials of the examples 1 to 7 and the comparative examples 1 to 3 across a broad spectral range. From this figure, it can be seen that the functionalizations according to the examples 1 to 7 do not significantly deteriorate T in the studied spectral range. The vial according to the comparative examples 3 shows a smaller T over a broad range of wavelengths, including the visible part of the electromagnetic spectrum.

For further studies, functionalized surfaces of vials according to the examples 1 and 5 and the comparative example 1 have been subjected to a scratch test which is described in detail in the above measurement methods sections. Typical results of these tests are shown in the FIGS. 8A to 8C. Therein, FIG. 8A shows an unfunctionalized surface of a vial according to comparative example 1 after having been subjected to the scratch test. FIG. 8B shows a functionalized vial surface according to example 1 and FIG. 8C shows a functionalized vial surface according to example 5, in each case after having been subjected to the scratch test. In these figures, the force with which the indenter is pushed against the vial surface is increased linearly from 0.1 N (at the left margins of the figures) up to 30 N (at the right margins of the figures). As the FIGS. 8A to 8C show typical results of the scratch test studies, it can be concluded that the scratch resistance of the vial surfaces which have been functionalized according to the invention has been greatly improved with respect to the unfunctionalized reference vial.

TABLE 3

N-content of the exterior surfaces of the vials of the examples 1 to 7 and the comparative examples 1 to 3

| Example | N-content of exterior surface [at.-%] |
|---|---|
| Example 1 | <2 |
| Example 2 | <2 |
| Example 3 | <2 |
| Example 4 | <2 |
| Example 5 | <2 |
| Example 6 | <2 |
| Example 7 | <2 |
| Comparative example 1 | <2 |
| Comparative example 2 | <2 |
| Comparative example 3 | 5 |

Furthermore, the N-content of the exterior surfaces of the vials prepared according to the examples 1 to 7 and the comparative examples 1 to 3 has been determined as described above in the measurement methods section. The results are summarised in Table 3 above. It can be seen that the polyimide coating of comparative example 3 contains an increased N-content with respect to the glass composition of the vial. The test results for an exemplary vial of the comparative example 3 are presented in FIG. 16.

Post-Treatment

For further studies, the vials of the examples 1 to 7 are subjected to two different kinds of post-treatment, i.e. a washing procedure or a depyrogenation procedure. These post-treatments are described below. The washing procedure is the same as used prior to functionalizing the vials in the examples 1 to 7.

Washing:

A HAMO LS 2000 washing machine is applied for the washing procedure. The HAMO LS 2000 is connected to the purified water supply. Further, the following devices are used.

cage 1: 144 with 4 mm nozzles
cage 2: 252 with 4 mm nozzles
drying cabinet from Heraeus (adjustable up to 300° C.)

The tap is opened. Then the machine is started via the main switch. After conducting an internal check, the washing machine shows to be ready on the display. Program 47 is a standard cleaning-program which operates with the following parameters:

pre-washing without heating for 2 min
washing at 40° C. for 6 min
pre-rinsing without heating for 5 min
rinsing without heating for 10 min
end-rinsing at without heating for 10 min
drying without heating for 5 min The holder for the vials in the cages 1 and 2 has to be adjusted considering the size of the vials in order to obtain a distance of the nozzle of about 1.5 cm. The vials to be washed are placed on the nozzles with the head first. Subsequently, the stainless-steel mesh is fixed on the cage. The cage is oriented to the left and pushed into the machine. Then the machine is closed. Program 47 (GLAS040102) is selected and then the HAMO is started via START. After the program has finished (1 h), the cages are taken out and the vials are placed with their opening facing downwards in drying cages. A convection drying cabinet with ambient air filter is applied for the drying. The drying cabinet is adjusted to 300° C. The vials are placed into the drying cabinet for 20 min. After the vials have cooled down, they are sorted into appropriate boxes.

Depyrogenation:

The vials are depyrogenised by placing them in an oven which is heated to 350° C. This temperature is kept constant for 1 h. Subsequently, the vials are taken out of the oven and left to cool down.

Evaluation After Post-Treatment

Figure 9:
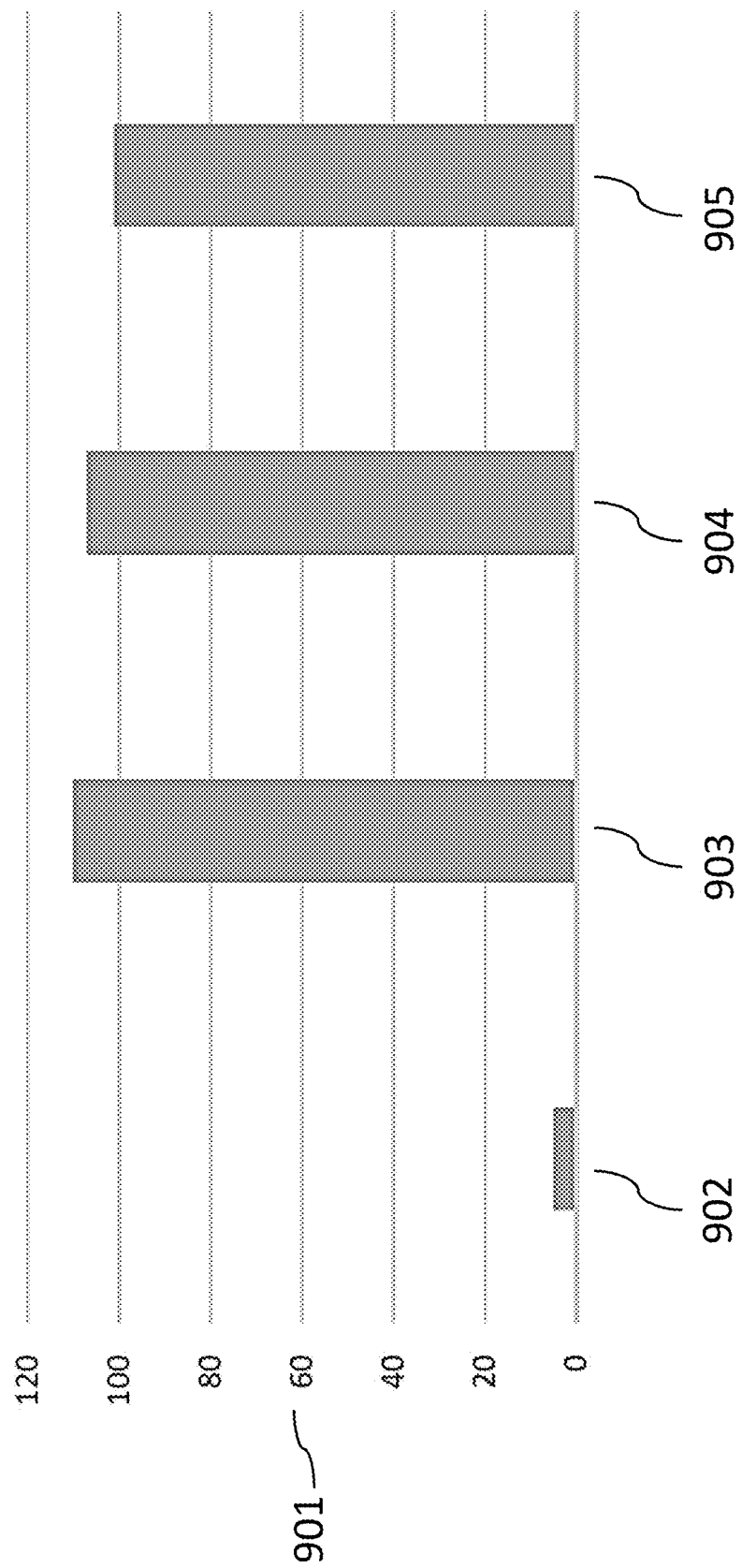
FIG. 9 shows a diagram with results of measurements of the contact angle for wetting with water on vials of example 1.
Figure 10:
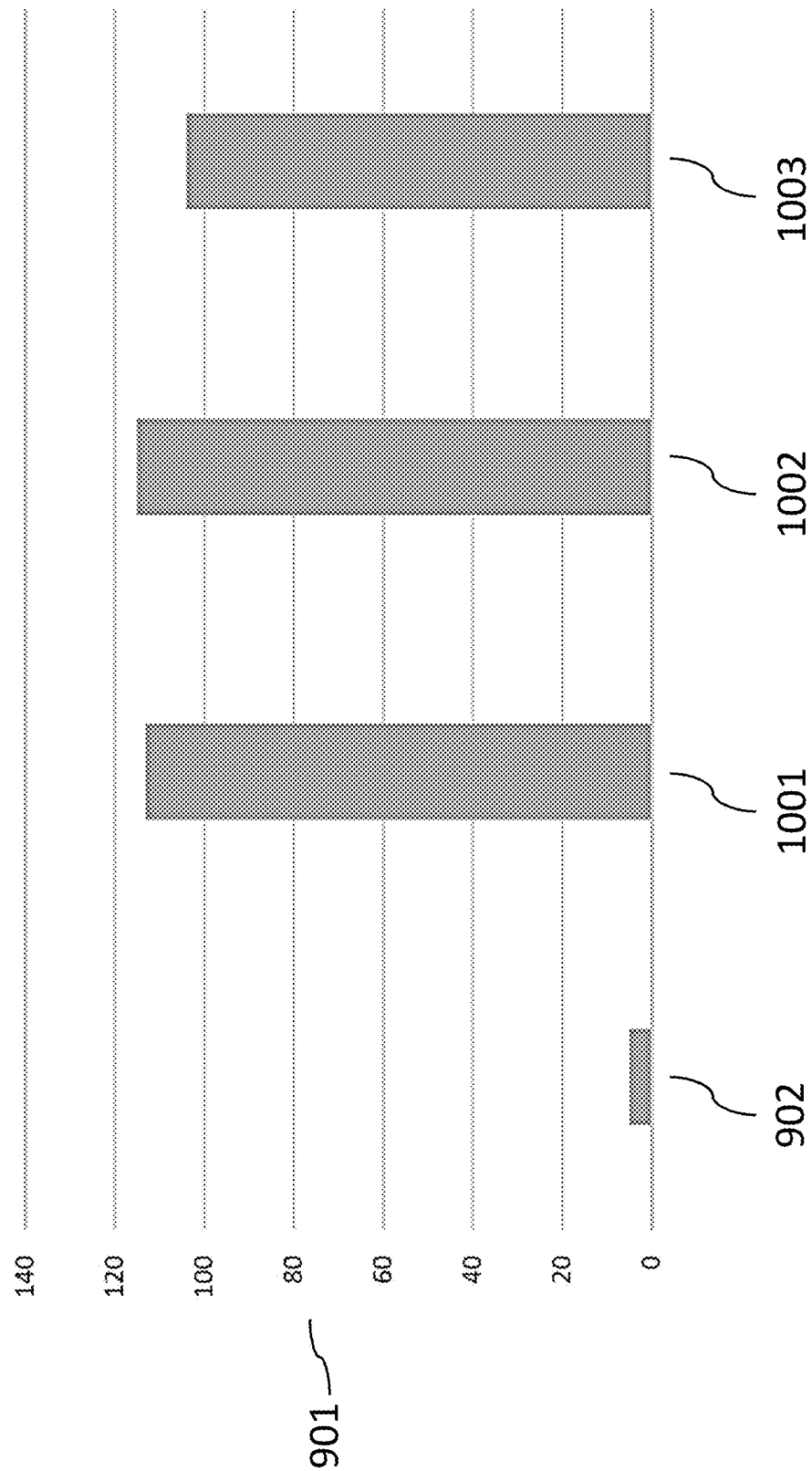
FIG. 10 shows a diagram with results of measurements of the contact angle for wetting with water on vials of example 5.
Figure 11:
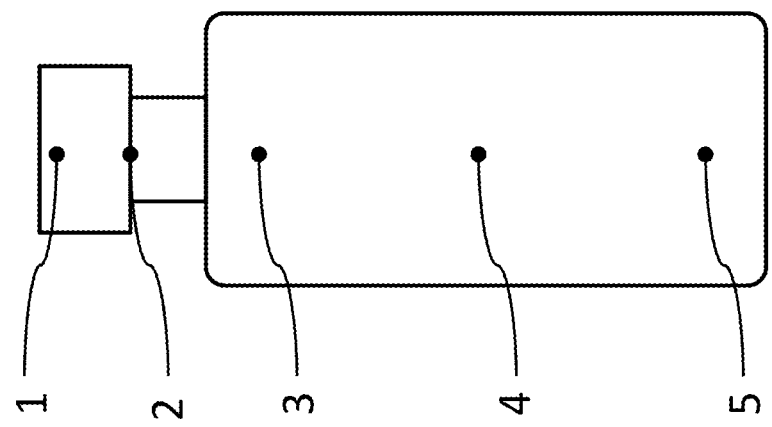
FIG. 11 shows a schematic depiction of the positions on the interior surface of vials at which the contact angle for wetting with water has been measured in the studies of contamination of the interior surface due to a washing process.

Vials of the examples 1 and 5 have been subjected either to the above washing procedure or to the depyrogenation procedure. Afterwards, the contact angle for wetting with water of the exterior surfaces of the vials in their tubular body regions have been measured. The results are shown in FIGS. 9 and 10. FIG. 10 compares, from left to right, the contact angles of vials of comparative example 1, of example 1 without post-treatment, of example 1 after washing, and of example 1 after depyrogenation. FIG. 11 compares, from left to right, the contact angles of vials of comparative example 1, of example 5 without post-treatment, of example 5 after washing, and of example 5 after depyrogenation. It is demonstrated that the functionalizations of examples 1 and 5 withstand the washing procedure as well as the depyrogenation procedure.

Figure 12:
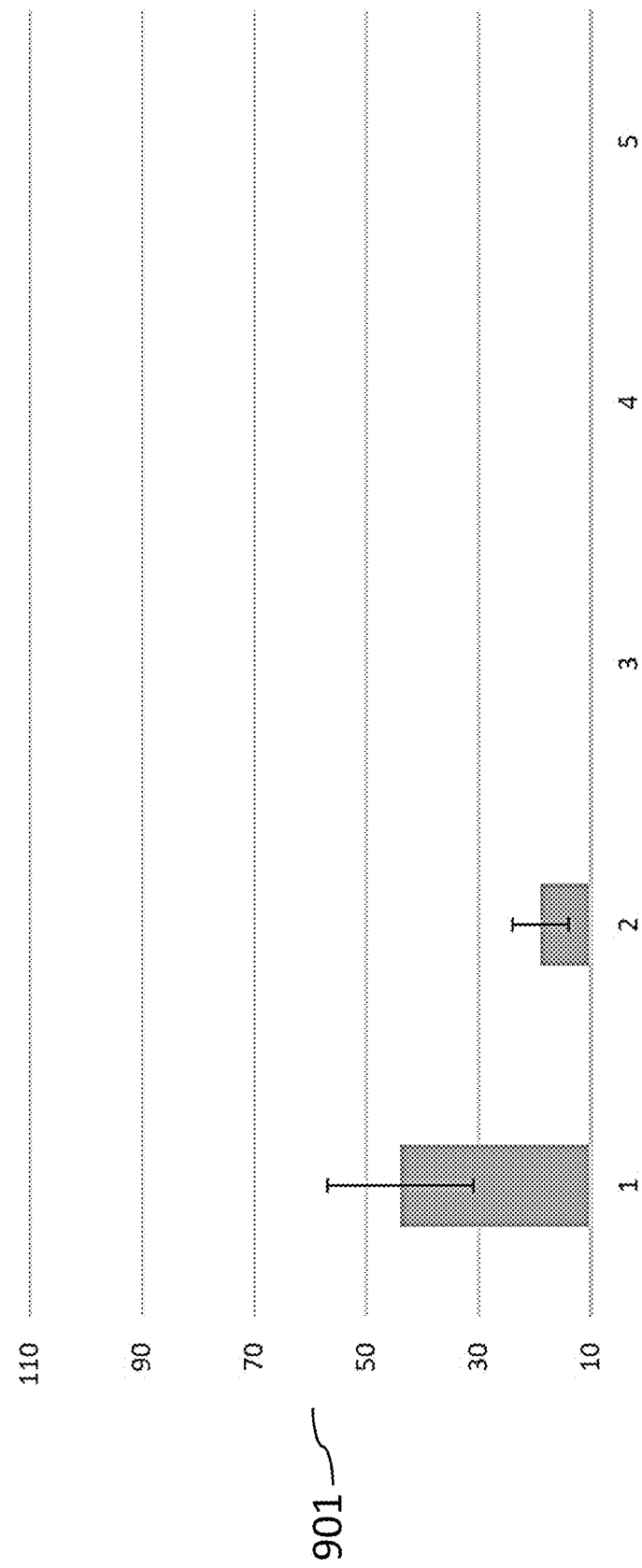
FIG. 12 shows results of the studies of contamination of the interior surface due to a washing process for vials of example 1.

For further studies, vials according to examples 1 and 5 have been washed as described above. Then the washed vials have been broken such that the interior surfaces became accessible for measurements of the contact angle for wetting with water. Those measurements have been conducted at 5 different positions (1 to 5) on the interior surface which are depicted schematically in FIG. 11. The measurement results for vials of example 1 are shown in FIG. 12 and for vials of example 5 in FIG. 13.

Even further tests have been conducted, in that vials according to the examples 1 to 7 have been freeze dried. Prior to and after this procedure the functionalized surfaces have been checked for damages and defects under the microscope at a magnification of 5 to 20 times. It has been observed that no defects or damages have been caused by the freeze-drying procedure.

FIG. 1 shows a schematic depiction of a hollow body 100 provided according to the invention. The hollow body 100 comprises a wall 102 which partially surrounds an interior volume 101 of the hollow body 100. The wall 102 surrounds the interior volume 101 only partially in that the hollow body 100 comprises an opening 107. The wall 102 forms from top to bottom in FIG. 1: a top region of the hollow body 100, which consists of a flange 108 and a neck 109; a body region 111, which follows the top region via a shoulder 110; and a bottom region 113, which follows the body region 111 via a heel 112. Here, the body region 111 is a lateral region of the hollow body 100 in form of a hollow cylinder. The wall 102 comprises a layer of glass 104 and a wall surface 103, wherein the layer of glass 104 extends across the full area of the wall surface 103. The wall surface 103 consists of an interior surface 106 which faces the interior volume 101, and an exterior surface 105 which faces away from the interior volume 101. In the body region 111, the exterior surface 105 is characterized by a contact angle for wetting with water of at least 80°. The hollow body 100 is a vial for packaging a pharmaceutical composition 401.

Figure 2:
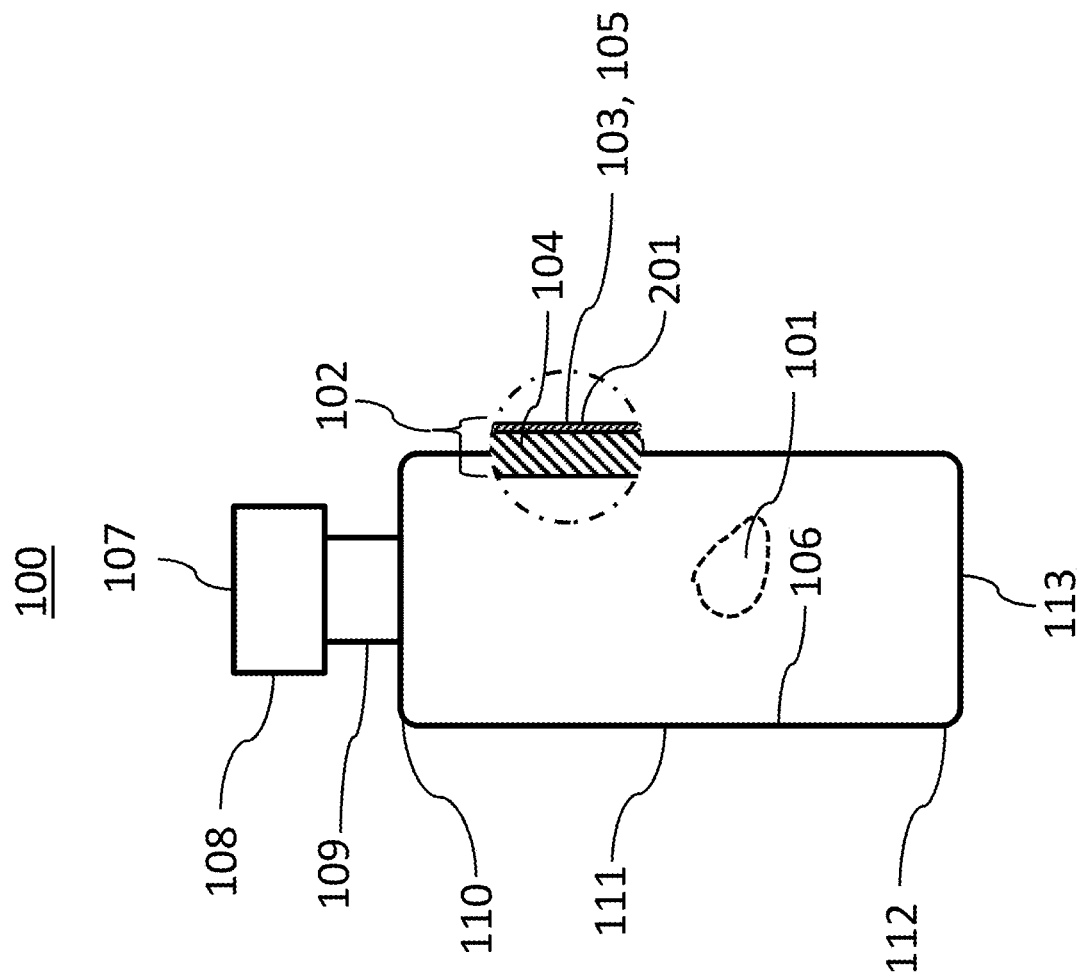
FIG. 2 shows a schematic depiction of a further hollow body provided according to the invention.

FIG. 2 shows a schematic depiction of a further hollow body 100 provided according to the invention. The hollow body 100 of FIG. 2 is a vial which is designed as the vial of FIG. 1. In addition, the wall 102 of the hollow body 100 of FIG. 2 comprises a functionalizing composition 201, which superimposes the layer of glass 104 on a side of the layer of glass 104 which faces away from the interior volume 1. The functionalizing composition 201 consists of 1H,1H,2H,2H-perfluorooctyltriethoxysilane. The hollow body 100 of FIG. 2 is a vial which has been functionalized according to the above example 1.

Figure 3:
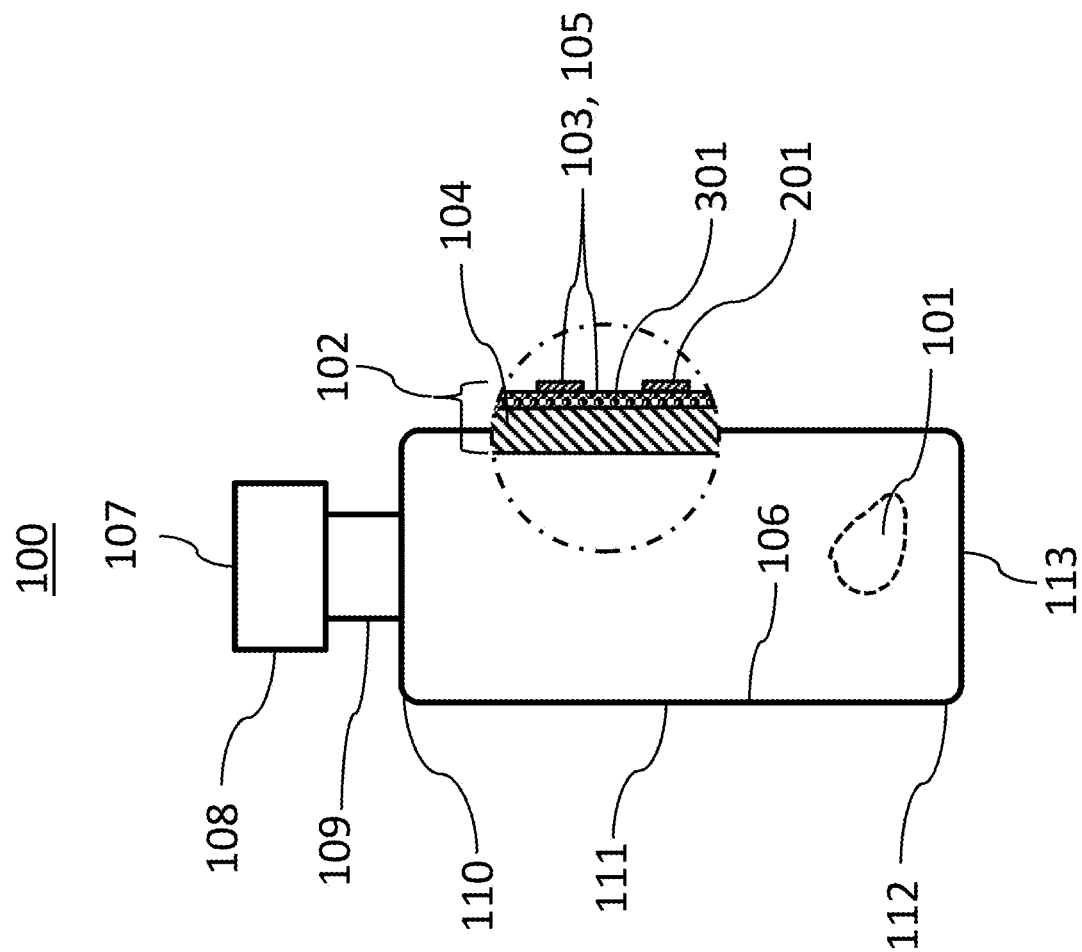
FIG. 3 shows a schematic depiction of a further hollow body provided according to the invention.

FIG. 3 shows a schematic depiction of a further hollow body 100 provided according to the invention. The hollow body 100 of FIG. 3 is a vial which is designed as the vial of FIG. 1. In addition, the wall 102 of the hollow body 100 of FIG. 3 comprises a plurality of particles 301, which are $SiO_2$-particles, and a functionalizing composition 201. The plurality of particles 301 adjoins the layer of glass 104 on a side of the layer of glass 104 facing away from the interior volume 1. The functionalizing composition 201 superimposes the layer of glass 104 and the plurality of particles 301 on the same side of the layer of glass 104. Here, the functionalizing composition 201 forms regions which each have a diameter in a range from 3 to 20 μm. These regions cover about 18% of a total surface area of the exterior surface 105 in the body region 111. The hollow body 100 of FIG. 3 is a vial which has been functionalized according to the above example 5.

Figure 4:
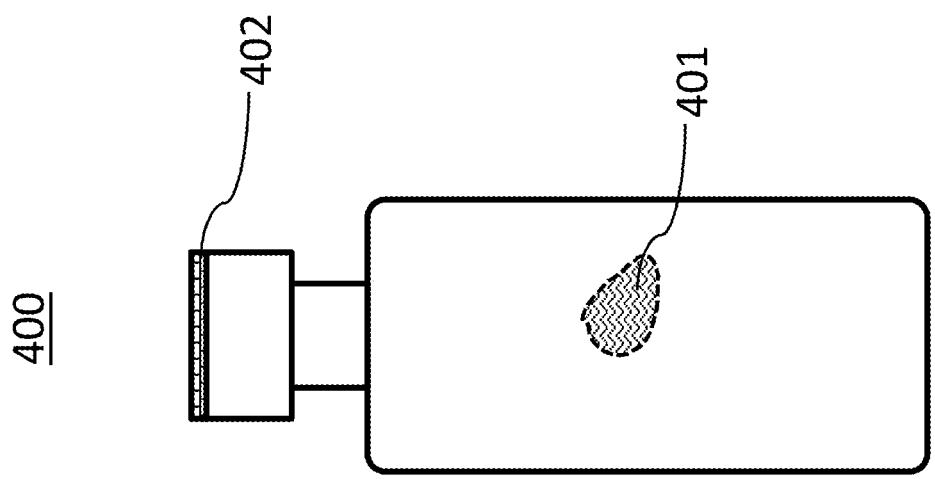
FIG. 4 shows a schematic depiction of a further hollow body provided according to the invention.

FIG. 4 shows a schematic depiction of a further hollow body 100 provided according to the invention. This hollow body 100 is a closed hollow body 400 which has been obtained by filling the hollow body 100 of FIG. 3 with a pharmaceutical composition 401 and closing the opening 107 with a lid 402.

Figure 5:
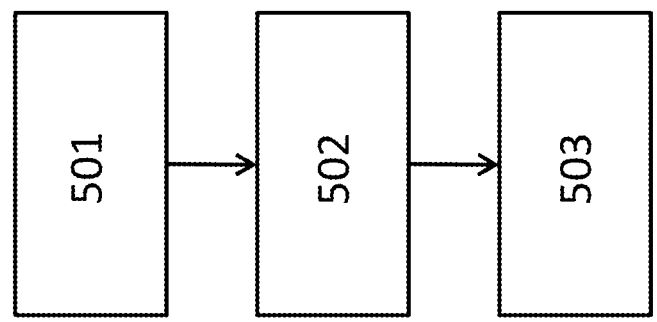
FIG. 5 shows a flow chart of a process provided according to the invention for the preparation of a hollow body.

FIG. 5 shows a flow chart of a process 500 provided according to the invention for the preparation of a hollow body 100. The process 500 comprises as process step a) 501 in which a commercially available glass vial of the type "Vial 2.00 ml Fiolax clear" from Schott AG which of the type 2R according to DIN/ISO 8362 is provided. A process step b) 502 of partially superimposing a layer of glass 104 of the vial with a functionalizing solution is conducted as described above for example 1. Also the subsequent step c) 503 of decreasing a proportion of isopropanol in the functionalizing solution is conducted as described in the context of example 1. Thereby, the hollow body 100 of FIG. 2 is obtained.

Figure 6:
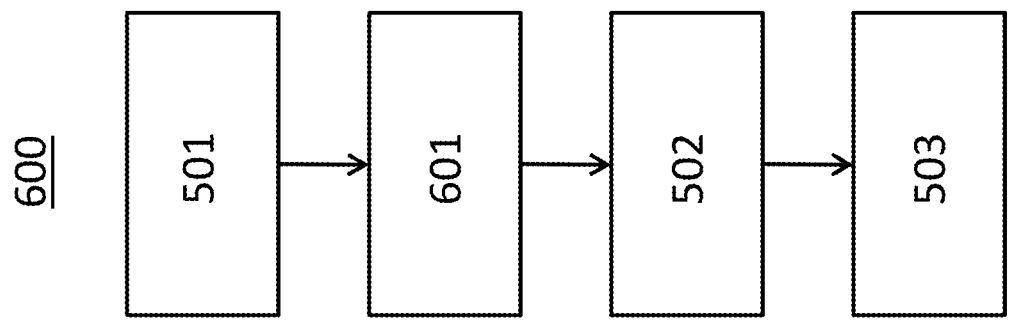
FIG. 6 shows a flow chart of a process provided according to the invention for the preparation of a hollow body.

FIG. 6 shows a flow chart of a further process 600 according to the invention for the preparation of a hollow body 100. This particular process 600 comprises as process step a) 501 in which a commercially available glass vial of the type "Vial 2.00 ml Fiolax clear" from Schott AG which of the type 2R according to DIN/ISO 8362 is provided. A further process step 601 of superimposing a plurality of particles 301 on the exterior surface 105 of the vial is conducted as described for example 5 as functionalizing with a first functionalizing solution which previously has been prepared as provided in example 5. Process steps b) 502 and c) 503 of the process 600 are conducted as the functionalizing with the second functionalizing solution in example 5. Thereby, the hollow body 100 of FIG. 3 is obtained.

FIG. 7 shows a flow chart of a process 700 provided according to the invention for packaging a pharmaceutical composition 401. In a process step A) 701, the hollow body 100 according to FIG. 3 is provided. In a process step B) 702, a pharmaceutical composition 401 is filled into the interior volume 101 of the hollow body 100, and in a process step C) 703 the opening 107 of the hollow body 100 is closed, thereby obtaining the closed hollow body 400 of FIG. 4, which is also a closed container 400 provided according to the invention.

FIG. 8A shows a microscope image of the result of a scratch test performed on the exterior surface of a vial of comparative example 1. In the figure, the applied force increases linearly from 0.1 N on the left margin to 30 N on the right margin.

FIG. 8B shows a microscope image of the result of a scratch test performed on the exterior surface of a vial of example 1. In the figure, the applied force increases linearly from 0.1 N on the left margin to 30 N on the right margin.

FIG. 8C shows a microscope image of the result of a scratch test performed on the exterior surface of a vial of example 5. In the figure, the applied force increases linearly from 0.1 N on the left margin to 30 N on the right margin.

FIG. 9 shows a diagram with results of measurements of the contact angle 901 for wetting with water on the exterior surface 105 of vials of example 1. The bar 902 shows the measurement results for vials according to comparative example 1 without any post-treatment which is used as a reference. Bar 903 shows the results for vials of example 1 without post-treatment, bar 904 for vials of example 1 after depyrogenation, and bar 905 for vials of example 1 after the washing procedure.

FIG. 10 shows a diagram with results of measurements of the contact angle 901 for wetting with water on the exterior surface 105 of vials of example 5. The bar 902 shows the measurement results for vials according to comparative example 1 without any post-treatment which is used as a reference. Bar 1001 shows the results for vials of example 5 without post-treatment, bar 1002 for vials of example 5 after depyrogenation, and bar 1003 for vials of example 5 after the washing procedure.

FIG. 11 shows a schematic depiction of the positions 1 to 5 on the interior surface 106 of vials at which the contact angle 901 for wetting with water has been measured in the studies of contamination of the interior surface 106 due to the washing procedure.

FIG. 12 shows results of the studies of contamination of the interior surface 106 due to the washing procedure for vials of example 1. Here, the contact angle 901 for wetting with water is plotted for each position 1 to 5.

Figure 13:
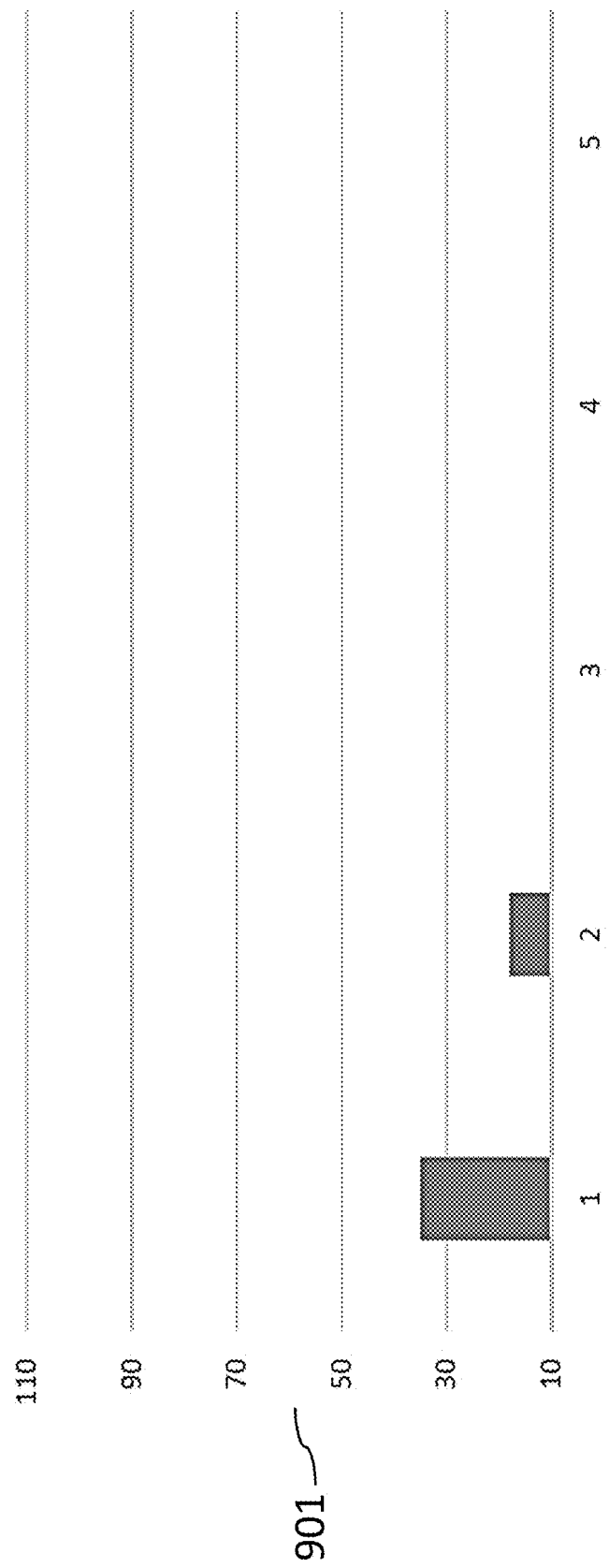
FIG. 13 shows results of the studies of contamination of the interior surface due to a washing process for vials of example 5.

FIG. 13 shows results of the studies of contamination of the interior surface due to the washing process for vials of example 5. Here, the contact angle 901 for wetting with water is plotted for each position 1 to 5.

FIG. 14 shows results of measurements of the transmission coefficient 1402 of vials according to the examples 1 to 7 and the comparative examples 1 to 3 over the wavelength in nm 1401. In the diagram, 1403 denotes the measurement results for the examples 1 to 7 and comparative examples 1 and 2. All these results are so close to each other that the corresponding graphs appear as one in the diagram. The dip at 865 nm is a measurement artefact. The measurement results for comparative example 3 are denoted by 1404.

Figure 15:
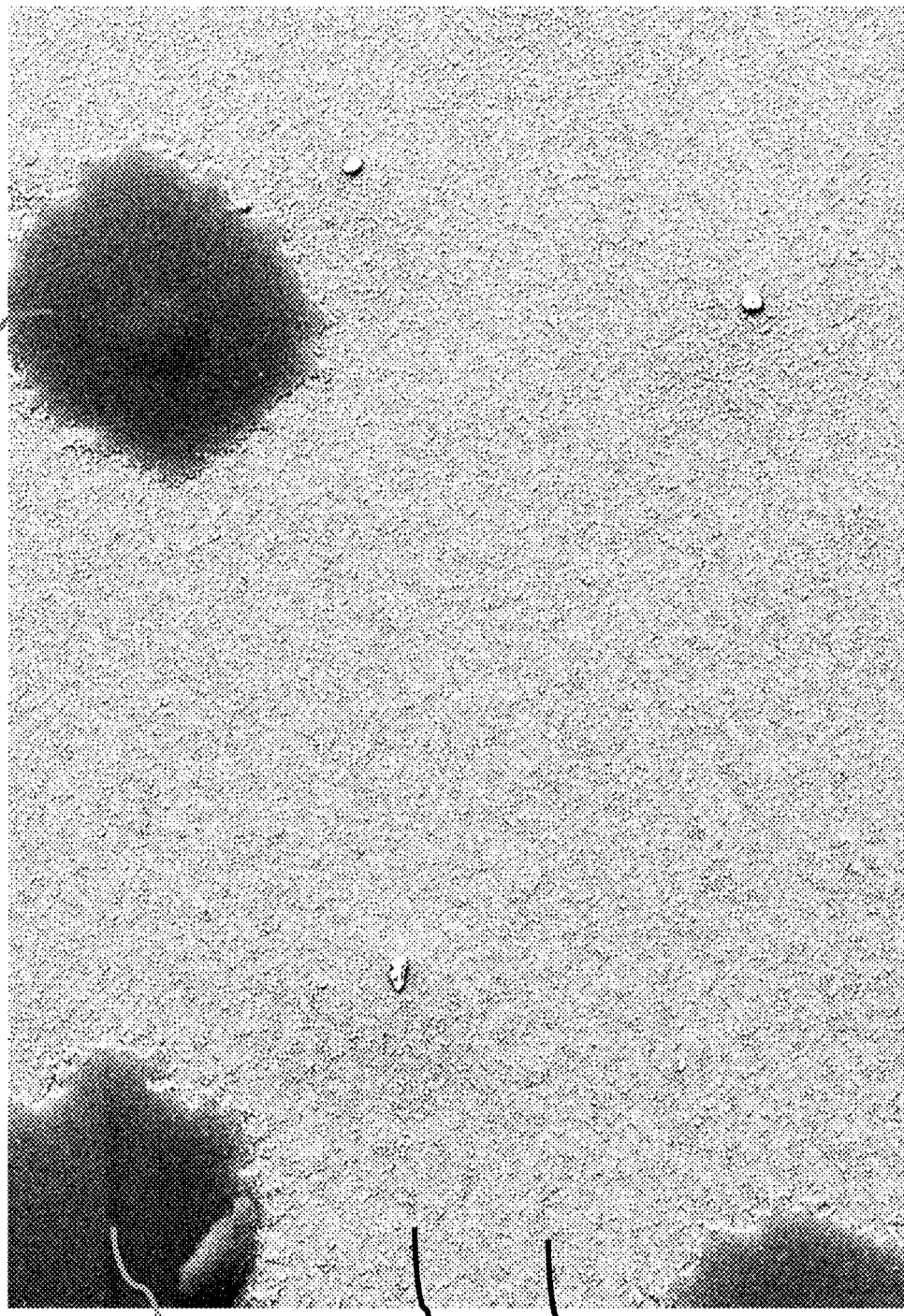
FIG. 15 a microscope image of the exterior surface of a vial according to example 5.

FIG. 15 shows a microscope image (magnification of 2,500 times) of the exterior surface 105 of the wall surface 103 of a vial according to example 5. Particles of the plurality of particles 301 can be seen as well as the functionalizing composition 201 forming regions of diameters in the range from 3 to 20 μm. These regions cover about 18% of a total surface area of the exterior surface 105 in the body region 111.

Figure 16:
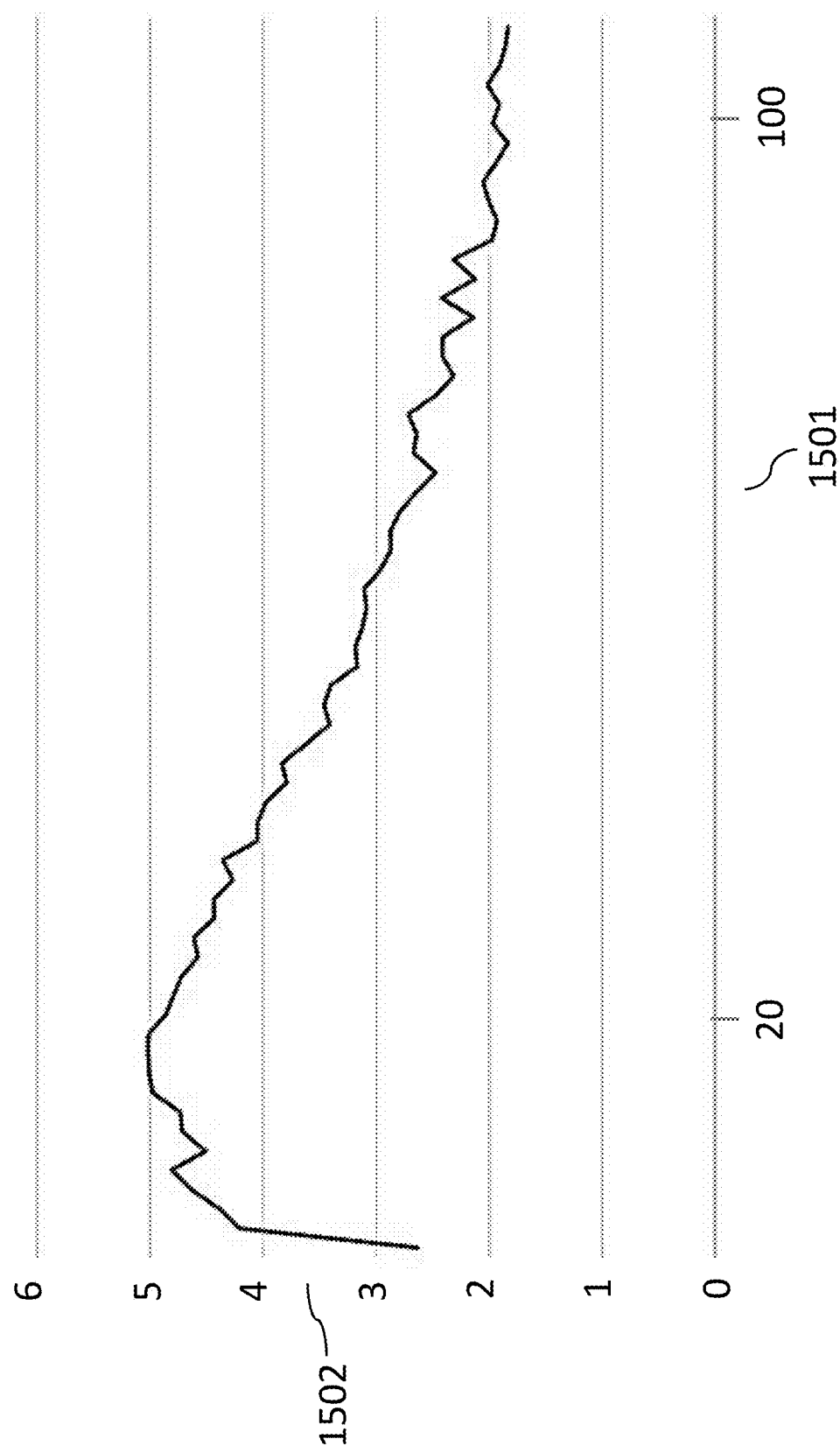
FIG. 16 shows test results of the N-content of the exterior surface of a vial according to comparative example 3.

FIG. 16 shows test results of the N-content in at.-% 1501 of the exterior surface of a vial according to comparative example 3 over the ablation in nm. The measurement has been conducted as described above in the measurement methods section. The figure shows that the maximum of the N-content of 5 at.-% has been found at a depths of slightly less than 20 nm from the exterior surface. At a depth of more than 100 nm, the N-content has dropped to less than 2.0 at.-%. This indicates that the polyimide coating is less than 100 nm thick and that the N-content of the glass composition of the vial is less than 2.0 at.-%.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS 100 hollow body
101 interior volume
102 wall
103 wall surface
104 layer of glass
105 exterior surface
106 interior surface
107 opening
108 flange
109 neck
110 shoulder
111 body region
112 heel
113 bottom region
201 functionalizing composition
301 plurality of particles
400 closed container/closed hollow body
401 pharmaceutical composition
402 lid
500 process for the preparation of a hollow body
501 process step a)
502 process step b)
503 process step c)
600 process for the preparation of a hollow body
601 process step of superimposing a plurality of particles
700 process for packaging a pharmaceutical composition
701 process step A)
702 process step B)
703 process step C)
901 contact angle for wetting with water in °
902 vials of comparative example 1 without post-treatment
903 vials of example 1 without post-treatment
904 vials of example 1 after depyrogenation
905 vials of example 1 after washing procedure
1001 vials of example 5 without post-treatment
1002 vials of example 5 after depyrogenation
1003 vials of example 5 after washing procedure
1 to 5 positions of measurement of the contact angle for wetting with water on the interior surface after the washing procedure
1401 wavelength in nm
1402 transmission coefficient
1403 measurement results for examples 1 to 7 and comparative examples 1 and 2
1404 measurement results for comparative example 3
1501 ablation in nm
1502 N-content in at.-%

What is claimed is:

1. A hollow body, comprising:
a wall which at least partially surrounds an interior volume of the hollow body, the wall comprising a layer of glass and a wall surface, the wall surface comprising a surface region which is characterized by a contact angle for wetting with water of at least 80° and a contact angle for wetting with n-hexadecane of at least 69°, wherein the contact angle for wetting with water and the contact angle for wetting with n-hexadecane are both determined in accordance with the standard DIN 55660 part 1 and part 2 on a curved surface at an ambient temperature of 22° C. to 25° C. and a relative atmospheric humidity of 20% to 35%; and
a functionalizing composition superimposing the layer of glass and defining the surface region of the wall surface, wherein the functionalizing composition is formed from a first composition precursor that is applied to the wall surface and comprises inorganic particles dispersed in water and a polysorbate, and a second composition precursor that differs from and is applied to the first composition precursor applied to the wall surface, the second composition precursor comprising a perfluorosulfonic acid; wherein the second composition precursor forms a plurality of regions which each have a diameter in a range from 1 to 100 μm and include the perfluorosulfonic acid, and the plurality of regions discontinuously superimpose the organic inorganic particles of the first composition precursor applied to the wall surface.

2. The hollow body according to claim 1, wherein the wall surface comprises an interior surface which faces the interior volume and an exterior surface which faces away from the interior volume, wherein at least one of the interior surface or the exterior surface comprises the surface region defined by the functionalizing composition.

3. The hollow body according to claim 1, wherein the wall surface comprises an interior surface which faces the interior volume and an exterior surface which faces away from the interior volume and comprises the surface region defined by the functionalizing composition, wherein the interior surface is characterized across its full area by a contact angle for wetting with water of less than 80°.

4. The hollow body of claim 1, wherein the surface region defined by the functionalizing composition has an increase in a haze of the hollow body with respect to an untreated hollow body of 0.3 or less.

5. The hollow body of claim 1, wherein the hollow body has a transmission coefficient for a transmission of a light of a wavelength in a range from 430 nm to 490 nm through the hollow body via the surface region of more than 0.7.

6. A closed container, comprising:
- a wall at least partially surrounding an interior volume which comprises a pharmaceutical composition, the wall comprising a layer of glass and having a wall surface comprising a surface region which faces away from the interior volume and is characterized by a contact angle for wetting with water of at least 80 and a contact angle for wetting with n-hexadecane of at least 69°, wherein the contact angle for wetting with water and the contact angle for wetting with n-hexadecane are both determined in accordance with the standard DIN 55660 part 1 and part 2 on a curved surface at an ambient temperature of 22° C. to 25° C. and a relative atmospheric humidity of 20% to 35%; and
- a functionalizing composition superimposing the layer of glass and defining the surface region of the wall surface, wherein the functionalizing composition is formed from a first composition precursor that is applied to the wall surface and comprises inorganic particles dispersed in water and a polysorbate, and a second composition precursor that differs from and is applied to the first composition precursor applied to the wall surface, the second composition precursor comprising a perfluorosulfonic acid; wherein the second composition precursor forms a plurality of regions which each have a diameter in a range from 1 to 100 μm and include the perfluorosulfonic acid, and the plurality of regions discontinuously superimpose the inorganic particles of the first composition precursor applied to the wall surface.

7. The closed container of claim 6, wherein the wall comprises inorganic particles at least partially superimposed by the functionalizing composition.

8. A hollow body, comprising:
- a wall which at least partially surrounds an interior volume of the hollow body, the wall comprising a layer of glass and a wall surface, the wall surface comprising a surface region which is characterized by a contact angle for wetting with water of at least 80 and a contact angle for wetting with n-hexadecane of at least 69°, wherein the contact angle for wetting with water and the contact angle for wetting with n-hexadecane are both determined in accordance with the standard DIN 55660 part 1 and part 2 on a curved surface at an ambient temperature of 22° C. to 25° C. and a relative atmospheric humidity of 20% to 35%; and
- a functionalizing composition superimposing the layer of glass and defining the surface region of the wall surface, wherein the functionalizing composition is formed from a first composition precursor that is applied to the wall surface and comprises inorganic particles dispersed in water and a polysorbate, and a second composition precursor that differs from and is applied to the first composition precursor applied to the wall surface, the second composition precursor comprising a perfluorinated silane; wherein the second composition precursor forms a plurality of regions which each have a diameter in a range from 1 to 100 μm and include the perfluorinated silane, and the plurality of regions discontinuously superimpose the inorganic particles of the first composition precursor applied to the wall surface.

* * * * *